(12) United States Patent
Knee et al.

(10) Patent No.: US 8,151,278 B1
(45) Date of Patent: Apr. 3, 2012

(54) SYSTEM AND METHOD FOR TIMER MANAGEMENT IN A STATEFUL PROTOCOL PROCESSING SYSTEM

(75) Inventors: Simon John Knee, Del Mar, CA (US); Fazil Ismet Osman, Escondido, CA (US); Vitek Zaba, San Diego, CA (US)

(73) Assignee: Astute Networks, Inc., San Diego, CA (US)

( * ) Notice: Subject to any disclaimer, the term of this patent is extended or adjusted under 35 U.S.C. 154(b) by 874 days.

(21) Appl. No.: 12/209,153

(22) Filed: Sep. 11, 2008

Related U.S. Application Data

(63) Continuation of application No. 10/649,373, filed on Aug. 27, 2003, now abandoned.

(60) Provisional application No. 60/419,687, filed on Oct. 17, 2002.

(51) Int. Cl.
*G06F 3/00* (2006.01)
*G06F 15/173* (2006.01)

(52) U.S. Cl. ........................ 719/318; 709/241

(58) Field of Classification Search .............. 719/318; 709/241
See application file for complete search history.

(56) References Cited

U.S. PATENT DOCUMENTS

| | | | |
|---|---|---|---|
| 4,130,865 A | 12/1978 | Heart et al. |
| 4,447,874 A | 5/1984 | Bradley et al. |
| 5,251,125 A | 10/1993 | Karnowski et al. |
| 5,303,344 A | 4/1994 | Yokoyama et al. |
| 5,321,844 A | 6/1994 | Schwagmann |
| 5,590,328 A | 12/1996 | Seno et al. |
| 5,640,394 A | 6/1997 | Schrier et al. |
| 5,706,429 A | 1/1998 | Lai et al. |
| 5,748,636 A | 5/1998 | Gradischnig |
| 5,812,781 A | 9/1998 | Fahlman et al. |
| 5,818,852 A | 10/1998 | Kapoor |
| 5,892,922 A | 4/1999 | Lorenz |
| 6,070,199 A | 5/2000 | Axtman et al. |
| 6,076,115 A | 6/2000 | Sambamurthy et al. |
| 6,084,855 A | 7/2000 | Soirinsuo et al. |
| 6,133,846 A | 10/2000 | Birkedahl et al. |
| 6,167,027 A | 12/2000 | Aubert et al. |

(Continued)

FOREIGN PATENT DOCUMENTS

WO    WO0041365    7/2000

(Continued)

OTHER PUBLICATIONS

Hexel, Validation of Fault Tolerance Mechanisms in a Time Trigger Communication Protocol Using Fault Injection 1999.*

(Continued)

*Primary Examiner* — Lechi Truong
(74) *Attorney, Agent, or Firm* — Cooley, LLP

(57) ABSTRACT

A system and method of processing data and managing protocol timers in a stateful protocol processing system configured to process multiple flows of messages is disclosed herein. The method includes receiving a first plurality of messages of a first of the flows comporting with a first stateful protocol. The method further includes assigning a first protocol processing core to process event information derived from the first plurality of messages. A first flow timer associated with the first of the flows is set, and a first timeout expiration event is generated upon expiration of the first flow timer. The first timeout expiration event is then forwarded to the first protocol processing core, and a first flow state associated with the first flow is retrieved in response thereto.

18 Claims, 13 Drawing Sheets

U.S. PATENT DOCUMENTS

| | | |
|---|---|---|
| 6,172,980 B1 | 1/2001 | Flanders et al. |
| 6,219,697 B1 | 4/2001 | Lawande et al. |
| 6,226,680 B1 | 5/2001 | Boucher et al. |
| 6,233,242 B1 | 5/2001 | Mayer et al. |
| 6,237,021 B1 | 5/2001 | Drummond |
| 6,247,060 B1 | 6/2001 | Boucher et al. |
| 6,252,851 B1 | 6/2001 | Siu et al. |
| 6,275,861 B1 | 8/2001 | Chaudri et al. |
| 6,300,964 B1 | 10/2001 | Intihar |
| 6,321,269 B1 | 11/2001 | Walker |
| 6,334,153 B2 | 12/2001 | Boucher et al. |
| 6,338,078 B1 | 1/2002 | Chang et al. |
| 6,393,458 B1 | 5/2002 | Gigliotti et al. |
| 6,453,360 B1 | 9/2002 | Muller et al. |
| 6,460,080 B1 | 10/2002 | Shah et al. |
| 6,480,489 B1 | 11/2002 | Muller et al. |
| 6,532,079 B1 | 3/2003 | Serex et al. |
| 6,532,501 B1 | 3/2003 | McCracken |
| 6,546,428 B2 | 4/2003 | Baber et al. |
| 6,587,884 B1 | 7/2003 | Papadopoulos et al. |
| 6,594,712 B1 | 7/2003 | Pettey et al. |
| 6,621,799 B1 | 9/2003 | Kemp et al. |
| 6,629,697 B1 | 10/2003 | Asai et al. |
| 6,662,213 B1 | 12/2003 | Xie et al. |
| 6,665,725 B1 | 12/2003 | Dietz et al. |
| 6,667,920 B2 | 12/2003 | Wolrich et al. |
| 6,668,317 B1 | 12/2003 | Bernstein et al. |
| 6,680,946 B1 | 1/2004 | Isoyama et al. |
| 6,681,253 B1 | 1/2004 | Suvanen et al. |
| 6,714,961 B1 | 3/2004 | Holmberg et al. |
| 6,735,717 B1 | 5/2004 | Rostowfske et al. |
| 6,768,992 B1 | 7/2004 | Jolitz |
| 6,775,706 B1 | 8/2004 | Fukumoto et al. |
| 6,829,697 B1 | 12/2004 | Davis et al. |
| 6,842,809 B2 | 1/2005 | Browning et al. |
| 6,883,064 B2 | 4/2005 | Yoshida et al. |
| 6,907,005 B1 | 6/2005 | Dahlman et al. |
| 6,909,713 B2 | 6/2005 | Magnussen et al. |
| 6,920,485 B2 | 7/2005 | Russell |
| 6,937,606 B2 | 8/2005 | Basso et al. |
| 6,944,670 B2 | 9/2005 | Krichevski et al. |
| 6,947,963 B1 | 9/2005 | Agarwal et al. |
| 6,970,913 B1 | 11/2005 | Albert et al. |
| 6,977,932 B1 | 12/2005 | Hauck |
| 6,981,027 B1 | 12/2005 | Gallo et al. |
| 6,981,051 B2 | 12/2005 | Eydelman et al. |
| 6,985,431 B1 | 1/2006 | Bass et al. |
| 6,996,117 B2 | 2/2006 | Lee et al. |
| 7,013,394 B1 | 3/2006 | Lingafelt et al. |
| 7,028,092 B2 | 4/2006 | Melampy et al. |
| 7,031,267 B2 | 4/2006 | Krumel |
| 7,031,311 B2 | 4/2006 | Melampy et al. |
| 7,039,037 B2 | 5/2006 | Wang et al. |
| 7,042,877 B2 | 5/2006 | Foster et al. |
| 7,046,676 B2 | 5/2006 | Goetzinger et al. |
| 7,051,112 B2 | 5/2006 | Dawson |
| 7,072,970 B2 | 7/2006 | Georgiou et al. |
| 7,076,555 B1 | 7/2006 | Orman et al. |
| 7,085,286 B2 | 8/2006 | Dias et al. |
| 7,085,869 B1 | 8/2006 | Acharya et al. |
| 7,089,282 B2 | 8/2006 | Rajamony et al. |
| 7,102,998 B1 | 9/2006 | Golestani |
| 7,106,756 B1 | 9/2006 | Donovan et al. |
| 7,114,008 B2 | 9/2006 | Jungck et al. |
| 7,120,158 B2 | 10/2006 | Kyusojin |
| 7,137,040 B2 | 11/2006 | Bae et al. |
| 7,143,131 B1 | 11/2006 | Soles et al. |
| 7,191,321 B2 | 3/2007 | Bernstein et al. |
| 7,215,637 B1 | 5/2007 | Ferguson et al. |
| 7,257,817 B2 | 8/2007 | Cabrera et al. |
| 7,274,706 B1 | 9/2007 | Nguyen et al. |
| 7,287,649 B2 | 10/2007 | Hayter et al. |
| 7,289,480 B2 | 10/2007 | Lundstrom et al. |
| 7,293,100 B2 | 11/2007 | Jayam et al. |
| 7,301,933 B1 | 11/2007 | Baggs et al. |
| 7,302,492 B1 | 11/2007 | Day |
| 7,313,140 B2 | 12/2007 | Lakshmanamurthy et al. |
| 7,328,270 B1 | 2/2008 | Reents et al. |
| 7,346,707 B1 | 3/2008 | Erimli |
| 7,360,217 B2 | 4/2008 | Melvin et al. |
| 7,765,328 B2 | 7/2010 | Bryers et al. |
| 2001/0003834 A1 | 6/2001 | Shimonishi |
| 2002/0007420 A1 | 1/2002 | Eydelman et al. |
| 2002/0016843 A1 | 2/2002 | Schweitzer et al. |
| 2002/0073232 A1 | 6/2002 | Hong et al. |
| 2002/0083173 A1 | 6/2002 | Musoll et al. |
| 2002/0099854 A1 | 7/2002 | Jorgensen |
| 2002/0099855 A1 | 7/2002 | Bass et al. |
| 2002/0122386 A1 | 9/2002 | Calvignac et al. |
| 2002/0143845 A1 | 10/2002 | Kardach |
| 2002/0174218 A1 | 11/2002 | Dick et al. |
| 2003/0014662 A1 | 1/2003 | Gupta et al. |
| 2003/0033379 A1 | 2/2003 | Civanlar et al. |
| 2003/0037154 A1 | 2/2003 | Poggio et al. |
| 2003/0041163 A1 | 2/2003 | Rhoades et al. |
| 2003/0074473 A1 | 4/2003 | Pham et al. |
| 2003/0079033 A1 | 4/2003 | Craft et al. |
| 2003/0158906 A1 | 8/2003 | Hayes |
| 2003/0163589 A1 | 8/2003 | Bunce et al. |
| 2003/0172169 A1 | 9/2003 | Cheng |
| 2003/0177252 A1 | 9/2003 | Krichevski et al. |
| 2003/0231660 A1 | 12/2003 | Vinnakota et al. |
| 2004/0004948 A1 | 1/2004 | Fletcher et al. |
| 2004/0010583 A1 | 1/2004 | Yu et al. |
| 2004/0024873 A1 | 2/2004 | DiMambro |
| 2004/0024894 A1 | 2/2004 | Osman et al. |
| 2004/0030873 A1 | 2/2004 | Park et al. |
| 2004/0042475 A1 | 3/2004 | Vinnakota et al. |
| 2004/0049596 A1 | 3/2004 | Schuehler et al. |
| 2004/0148472 A1 | 7/2004 | Barroso et al. |
| 2004/0210320 A1 | 10/2004 | Pandya |
| 2004/0210795 A1 | 10/2004 | Anderson |
| 2004/0268062 A1 | 12/2004 | Ofer |
| 2005/0160097 A1 | 7/2005 | Gschwind et al. |
| 2006/0168283 A1 | 7/2006 | Georgiou et al. |
| 2006/0292292 A1 | 12/2006 | Brightman et al. |
| 2007/0025380 A1 | 2/2007 | Amagai et al. |
| 2008/0062927 A1 | 3/2008 | Zhu et al. |

FOREIGN PATENT DOCUMENTS

| | | |
|---|---|---|
| WO | WO0101272 A2 | 1/2001 |
| WO | WO0215027 A | 2/2002 |

OTHER PUBLICATIONS

U.S. Appl. No. 12/684,092 Non-Final Rejection mailed Feb. 17, 2011.
U.S. Appl. No. 10/660,456 Final Rejection mailed Nov. 24, 2010.
Camarillo et al., "Mapping of Media Streams to Resource Reservation Flows," In: Network Working Group, Request for Comments No. 3524, Category: Standards Track, Apr. 2003, p. 1-6.
EP Application 3766851.4 Office Action dated Jun. 17, 2009.
EP Application 3766851.4 Supplemental European Search Report mailed Dec. 15, 2008.
Murali Rangarajan et al., tcp Servers: Offloading TCP Processing in Internet Servers Design, Implementation, and Performance, Internet Citation, [Online] Mar. 2002, XP002286342 Retrieved from the Internet: URL: URL: discolab.rutgers.edu/split-o.
PCT/US03/21583 International Preliminary Examination Report mailed Mar. 10, 2004.
PCT/US03/21583 International Search Report mailed Mar. 10, 2004.
RFC 793, TCP, Obtained at www.ietf.org.
U.S. Appl. No. 10/660,055 Non-Final Rejection mailed Feb. 21, 2007.
U.S. Appl. No. 10/660,055 Final Rejection mailed Aug. 9, 2007.
U.S. Appl. No. 10/660,055 Non-Final Rejection mailed Feb. 7, 2008.
U.S. Appl. No. 10/660,055 Final Rejection mailed Oct. 17, 2008.
U.S. Appl. No. 10/660,055 Non-Final Rejection mailed Jul. 7, 2009.
U.S. Appl. No. 10/660,055 Notice of Allowance mailed Apr. 15, 2010.
U.S. Appl. No. 10/649,112 Non-Final Rejection mailed Oct. 3, 2007.
U.S. Appl. No. 10/649,112 Non-Final Rejection mailed Mar. 31, 2009.
U.S. Appl. No. 10/649,112 Final Rejection mailed Nov. 13, 2009.

U.S. Appl. No. 10/649,364 Non-Final Rejection mailed Mar. 12, 2007.
U.S. Appl. No. 10/649,364 Non-Final Rejection mailed Oct. 5, 2007.
U.S. Appl. No. 10/649,364 Final Rejection mailed Jul. 21, 2008.
U.S. Appl. No. 10/649,364 Final Rejection mailed May 21, 2009.
U.S. Appl. No. 10/649,373 Non-Final Rejection mailed Jul. 3, 2007.
U.S. Appl. No. 10/649,373 Final Rejection mailed Jun. 11, 2008.
U.S. Appl. No. 10/649,373 Non-Final Rejection mailed Mar. 3, 2009.
U.S. Appl. No. 10/649,373 Final Rejection mailed Nov. 24, 2009.
U.S. Appl. No. 10/660,456 Non-Final Rejection mailed Jul. 9, 2008.
U.S. Appl. No. 10/660,456 Final Rejection mailed Mar. 10, 2009.
U.S. Appl. No. 10/660,456 Non-Final Rejection mailed Aug. 4, 2009.
U.S. Appl. No. 10/660,456 Non-Final Rejection mailed Mar. 16, 2010.
U.S. Appl. No. 10/661,096 Non-Final Rejection mailed Mar. 2, 2007.
U.S. Appl. No. 10/661,096 Final Rejection mailed Aug. 6, 2007.
U.S. Appl. No. 10/661,096 Non-Final Rejection mailed Dec. 5, 2007.
U.S. Appl. No. 10/661,096 Final Rejection mailed Aug. 21, 2008.
U.S. Appl. No. 10/661,096 Notice of Allowance mailed Apr. 9, 2009.
U.S. Appl. No. 10/661,084 Non-Final Rejection mailed Jul. 16, 2008.
U.S. Appl. No. 10/661,084 Final Rejection mailed Jan. 29, 2009.
U.S. Appl. No. 10/661,084 Non-Final Rejection mailed Dec. 7, 2009.
U.S. Appl. No. 10/211,434 Non-Final Rejection mailed Jun. 25, 2004.
U.S. Appl. No. 10/211,434 Final Rejection mailed Apr. 6, 2005.
U.S. Appl. No. 10/211,434 Non-Final Rejection mailed Sep. 21, 2005.
U.S. Appl. No. 10/211,434 Final Rejection mailed Apr. 18, 2006.
U.S. Appl. No. 10/211,434 Non-Final Rejection mailed Jul. 3, 2008.
U.S. Appl. No. 10/211,434 Non-Final Rejection mailed Nov. 10, 2009.
Werner Bux et al., Technologies and Building Blocks for Fast Packet Forwarding IEEE Communications Magazine, IEEE Service Center, Pascataway, US, vol. 39, No. 1, Jan. 1, 2001, pp. 70-77, ISSN: 0163-6804.
U.S. Appl. No. 10/211,434 Non-Final Rejection mailed Aug. 26, 2010.
EP Application 11171496.0 Extended European Search Report mailed Aug. 3, 2011.

* cited by examiner

SYSTEM AND METHOD FOR TIMER MANAGEMENT IN A STATEFUL PROTOCOL PROCESSING SYSTEM

CROSS-REFERENCE TO RELATED APPLICATIONS

This application is a continuation of and claims priority to U.S. Utility patent application Ser. No. 10/649,373, entitled SYSTEM AND METHOD FOR TIMER MANAGEMENT IN A STATEFUL PROTOCOL PROCESSING SYSTEM, filed on Aug. 27, 2003, which claims priority to U.S. Provisional Application No. 60/419,687, entitled SYSTEM AND METHOD FOR TIMER MANAGEMENT IN A STATEFUL PROTOCOL PROCESSING SYSTEM, filed on Oct. 17, 2002. This application is also related to U.S. Utility patent application Ser. No. 10/211,434, entitled HIGH DATA RATE STATEFUL PROTOCOL PROCESSING, filed on Aug. 2, 2002. The content of each of these applications is hereby incorporated by reference herein in its entirety for all purposes.

FIELD OF THE INVENTION

This invention relates generally to data transfer processing systems. More particularly but not exclusively, this invention relates to systems capable of transferring data in a manner consistent with a stateful protocol.

BACKGROUND

Background and Benefits of the Invention

Data transfer systems typically convey data through a variety of layers, each performing different types of processing. The number of different layers, and their attributes, vary according to the conceptual model followed by a given communication system. Examples include a model having seven layers that is defined by the International Standards Organization (ISO) for Open Systems Interconnection (OSI), and a five-layer model defined by the American National Standards Institute (ANSI) that may be referred to as the "Fibre Channel" model. Many other models have been proposed that have varying numbers of layers, which perform somewhat different functions. In most data communication systems, layers range from a physical layer, via which signals containing data are transmitted and received, to an application layer, via which high-level programs and processes share information. In most of the conceptual layer models, a Transport Layer exists between these extremes. Within such transport layers, functions are performed that are needed to coordinate the transfer of data, which may have been sent over diverse physical links, for distribution to higher-level processes.

Within the transport layer, a communication system coordinates numerous messages (such as packets) that each belong to a particular "flow" or grouping of such messages. Each message may be identified by its association with a particular flow identification key (flow key), which in turn is typically defined by information about the endpoints of the communication. Transport layer processing is generally performed by processing modules which will be referred to as transport layer terminations (TLTs), which manage data received from remote TLTs (or being transmitted to the remote TLTs) according to a set of rules defined by the transport layer protocol (TLP) selected for each particular flow. A TLT examines each message that it processes for information relevant to a flowstate that defines the status of the flow to which the message belongs, updates the flowstate accordingly, and reconstitutes raw received data on the basis of the flowstate into proper form for the message destination, which is typically either a remote TLT or a local host. Flows are typically bidirectional communications, so a TLT receiving messages belonging to a particular flow from a remote TLT will generally also send messages belonging to the same flow to the remote TLT. Management of entire flows according to selected TLPs by maintaining corresponding flowstates distinguishes transport layer processing from link level processing, which is generally concerned only with individual messages.

There are many well-known TLPs, such as Fibre Channel, SCTP, UDP and TCP, and more will likely be developed in the future. TLPs typically function to ensure comprehensible and accurate communication of information to a target, such as by detecting and requesting retransmission of lost or damaged messages, reorganizing various messages of a flow into an intended order, and/or providing pertinent facts about the communication to the target. Transmission Control Protocol (TCP) is probably the best-known example of a TLP, and is extensively used in networks such as the Internet and Ethernet applications. TCP is a connection-oriented protocol, and information about the state of the connection must be maintained at the connection endpoints (terminations) while the connection is active. The connection state information includes, for example, congestion control information, timers to determine whether packets should be resent, acknowledgement information, and connection identification information including source and destination identification and open/closed status. Each active TCP connection thus has a unique connection ID and a connection state. A TCP "connection" is an example of the more general TLP concept that is termed "flow" herein, while TCP "connection ID" and "connection state" are examples of the more general TLP concepts referred to herein as "flow key" and "flowstate," respectively. The flow key may be uniquely specified by a combination of the remote link (destination) address (typically an Internet Protocol or "IP" address), the remote (destination) TCP port number, the local link (source) address (also typically an IP address), the local (source) TCP port number, and in some cases a receiver interface ID. It may also be useful to include a protocol indication as part of the general flow key, in order to distinguish flows that have otherwise identical addressing but use different TLPs.

Data communications can also occur in many layers other than the classic transport layer. For example, iSCSI communications occur at layers above the transport layer, yet the communications include stateful messages belonging to a flow and are thus analogous, in some ways, to transport layer communications.

There is a constant demand for higher data rates for data communications systems, as computers are increasingly linked both locally (e.g., over local area networks) and over wide areas (e.g., over the Internet). In order to achieve higher data rates, commensurately faster processing is needed for stateful protocols in transport layers and elsewhere. Faster hardware, of course, may be able to proportionally increase processing speeds. However, hardware speed increases alone will not cost-effectively increase protocol processing speeds as quickly as desired, and thus there is a need for protocol processing systems that enable faster processing, for a given hardware speed, by virtue of their architecture and methods.

SUMMARY

In summary, the present invention relates to a method of processing data in a stateful protocol processing system configured to process multiple flows of messages. The method includes receiving a first plurality of messages of a first of the flows, such first flow comporting with a first stateful protocol. The method further includes assigning a first protocol processing core to process event information derived from the first plurality of messages. Consistent with the method, a first flow timer associated with the first of the flows is set. A first timeout expiration event is then generated upon expiration of the first flow timer. The first timeout expiration event is forwarded to the first protocol processing core, and a first flow state associated with the first flow is retrieved in response thereto.

In another aspect, the present invention also relates to a method of processing data in a stateful protocol processing system configured to process multiple flows of messages. The method includes receiving a first plurality of messages of a first of the flows, such first flow comporting with a first stateful protocol. The method further includes assigning a first protocol processing core to process event information derived from the first plurality of messages. Values of a plurality of timers associated with the first of the flows are stored within memory. Consistent with the method, the first protocol processing core sets a reset bit associated with one of the plurality of timers. A value of one of the plurality of timers is then adjusted in response to the setting of the reset bit. In a particular embodiment the method includes generating a first timeout expiration event upon expiration of the one of the plurality of timers, and forwarding the first timeout expiration event to the first protocol processing core. A first flow state associated with the first of the flows is then provided to the first protocol processing core in response to the first timeout expiration event.

The present invention also pertains to a stateful protocol processing system configured to process multiple flows of messages. An input module is configured to receive a first plurality of messages of a first of the flows, such first flow comporting with a first stateful protocol. A dispatcher is operative to assign a first protocol processing core to process event information derived from the first plurality of messages. The apparatus further includes a lookup controller configured to generate a first timeout expiration event upon expiration of a first flow timer associated with the first flow. The lookup controller also forwards the first timeout expiration event to the dispatcher, which may service the timeout expiration event by requesting the lookup controller to retrieve a first flow state characterizing the first flow.

The lookup controller may further include a timer control unit operative to maintain a plurality of timers associated with the first of the flows. In an exemplary embodiment a first flow state characterizing the first flow is stored within a common memory. The inventive apparatus may further include a timer cache capable of storing values of the plurality of timers upon checking out of the first flow state from the common memory to a local memory of the first protocol processing core.

BRIEF DESCRIPTION OF THE DRAWINGS

For a better understanding of the nature of the features of the invention, reference should be made to the following detailed description taken in conjunction with the accompanying drawings, in which:

FIG. 11 is a flowchart which illustrates the various transitions experienced by a flow director unit entry upon expiration of the timers associated with a corresponding flow.

DETAILED DESCRIPTION OF PREFERRED EMBODIMENTS

Overview of Stateful Protocol Processing

Figure 1A:
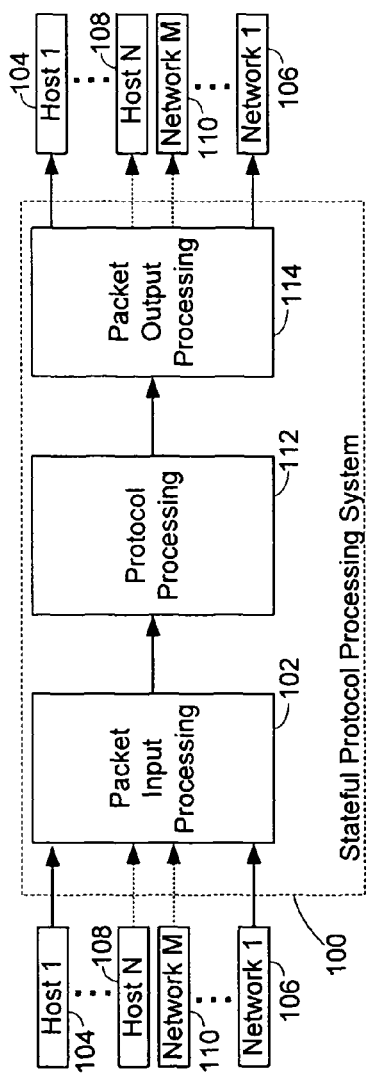
FIG. 1A is a block diagram showing general interface connections to a stateful protocol processing system.

Stateful protocol processing entails processing data that arrives in identifiable and distinguishable units that will be referred to herein as "messages." A multiplicity of messages will belong to a "flow," which is a group of messages that are each associated with a "flow key" that uniquely identifies the flow. The methods and apparatus described herein for stateful protocol processing are most useful when a multiplicity of different flows is concurrently active. A flow is "active" whether or not a message of the flow is presently being processed, as long as further messages are expected, and becomes inactive when no further processing of messages belonging to the particular flow are expected.

A "stateful protocol" defines a protocol for treating messages belonging to a flow in accordance with a "state" that is maintained to reflect the condition of the flow. At least some (and typically many) of the messages belonging to a flow will affect the state of the flow, and stateful protocol processing therefore includes checking incoming messages for their effect on the flow to which they belong, updating the state of the flow (or "flowstate") accordingly, and processing the messages as dictated by the applicable protocol in view of the current state of the flow to which the messages belong.

Processing data communications in accordance with TCP (Transmission Control Protocol) is one example of stateful protocol processing. A TCP flow is typically called a "connection," while messages are packets. The flow key associated with each packet consists primarily of endpoint addresses (e.g., source and destination "socket addresses"). A flowstate is maintained for each active connection (or flow) that is updated to reflect each packet of the flow that is processed. The actual treatment of the data is performed in accordance with the flowstate and the TCP processing rules.

TCP is a protocol that is commonly used in TLT (transport layer termination) systems. A typical TLT accepts messages in packets, and identifies a flow to which the message belongs, and a protocol by which the message is to be processed, from information contained within the header of the packet. However, the information that is required to associate a message with a flow to which it belongs and a protocol by which it is to be processed may be provided in other ways, such as indirectly or by implication from another message with which it is associated, or by a particular source from which it is derived (for example, if a particular host is known to have only one flow active at a time, then by implication each message from that host belongs to the flow that is active with respect to that host.

Moreover, stateful protocol processing as described herein may be utilized in places other than TLT systems, in which case the information about flow and protocol may well be provided elsewhere than in an incoming packet header. For example, an incoming TCP packet may encapsulate data that is to be processed according to an entirely different protocol, in a different "layer" of processing. Accordingly, the stateful protocol processing effected within the context of a TLT system described herein provides a specific example of a general stateful protocol processing system ("SPPS"). Messages belonging to one stateful protocol flow may, for example, be encapsulated within messages belonging to a distinct stateful protocol. The well-known communication protocol referred to as "SCSI" provides examples of data communication at layers other than a transport layer. A common use of SCSI is between a host and a peripheral device such as a disk drive. SCSI communications may take place over a special purpose connection dedicated to SCSI communications, or they may be encapsulated and conveyed via a different layer. SCSI may be encapsulated within messages of some transport layer protocols, such as Fibre Channel and TCP. "FCP" is a protocol by which SCSI messages are encapsulated in Fibre Channel protocol messages, while "iSCSI" is a protocol by which SCSI messages are encapsulated in TCP messages. FCP and iSCSI are each stateful protocols.

One example of such encapsulation involves information belonging to a first stateful flow, such as an iSCSI flow, that is communicated over a local network within messages belonging to a distinct second stateful flow, such as a TCP connection. A first SPPS may keep track of the state of the encapsulating TCP connection (flow). The same SPPS, or a different second one, may determine that some of the messages conveyed by the encapsulating flow form higher-level messages that belong to an encapsulated iSCSI flow. The flow key of the encapsulated iSCSI flow may be contained within each encapsulated message, or it may be determined by implication from the flow key of the encapsulating TCP/IP packets that are conveying the information. Given knowledge of the flow key of the encapsulated flow, and of the protocol (iSCSI) by which the encapsulated flow is to be processed, the SPPS may maintain a state for the iSCSI flow, and may identify and process the messages associated with the flow in accordance with the specified protocol (iSCSI, in this example).

Thus, a transport layer termination system may provide a good example of a SPPS (stateful protocol processing system). Indeed, a TLT is likely to include at least some stateful processing, thus qualifying as a SPPS. However, a SPPS can be utilized for other data communication layers, and for other types of processing, as long as the processing includes updating the flowstate of a flow to which a multiplicity of messages belong, in accordance with a stateful protocol that is defined for the messages. Therefore, although the invention is illustrated primarily with respect to a TLT system, care should be taken not to improperly infer that the invention is limited to TLT systems.

FIG. 1A illustrates interface connections to a SPPS 100. A SPPS packet input processing block 102 may accept data in packets from any number of sources. The sources typically include a host connection, such as "Host 1" 104, and a network connection, such as "Network 1" 106, but any number of other host connections and/or network connections may be used with a single system, as represented by "Host N" 108 and "Network M" 110. A protocol processing block 112 processes incoming data in accordance with the appropriate rules for each flow of data (i.e., stateful protocol rules such as are defined by the well-known TCP, for stateful messages specified for processing according to such stateful protocol). Flows generally involve bidirectional communications, so data is typically conveyed both to and from each host connection and/or network connection. Consequently, a packet output processing block 114 delivers data to typically the same set of connections ("Host 1" 104 to "Host N" 108 and "Network 1" 106 to "Network M" 110) from which the packet input processing block 102 receives data.

Figure 1B:
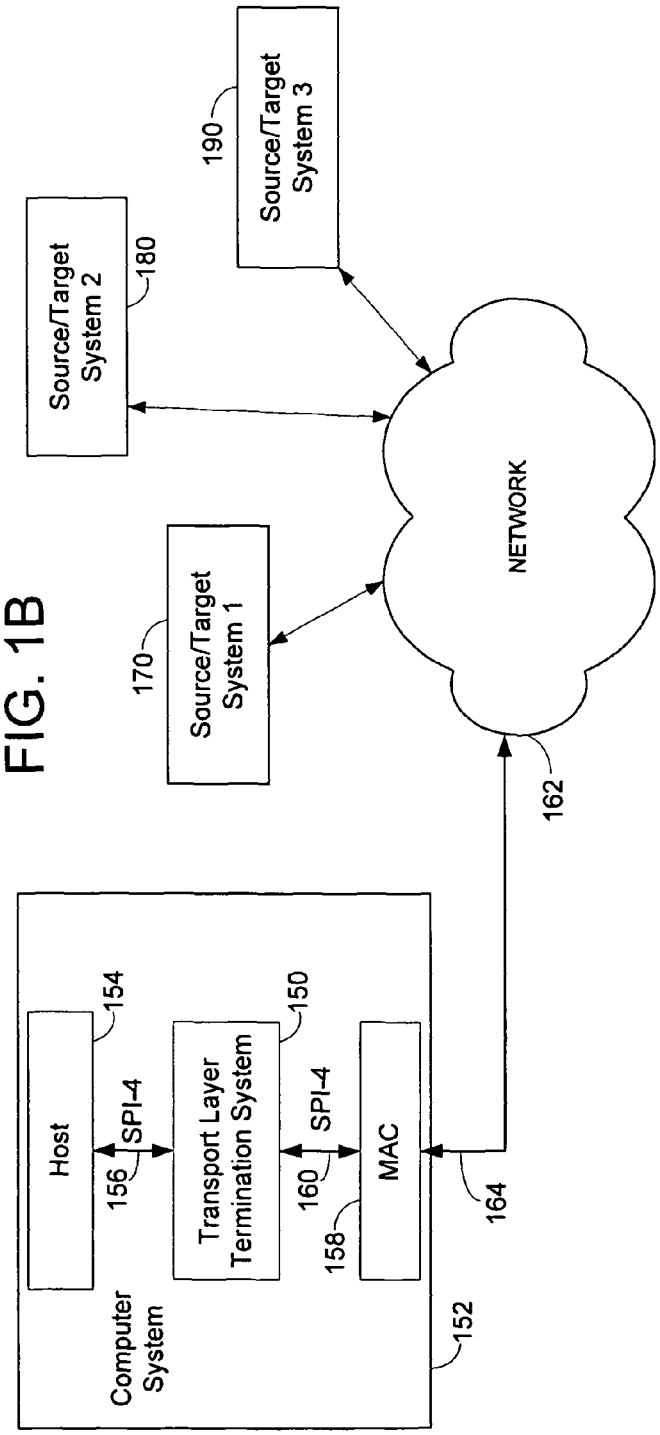
FIG. 1B is a block diagram of a transport layer termination system within a typical computer system.

FIG. 1B provides an overview of connections to a TLTS 150 that provides an example of a simple SPPS as implemented within a computing system 152. A single host system 154 is connected to the TLTS 150 via a connection 156 that uses a well-known SPI-4 protocol. The host 154 behaves as any of the hosts 104-108 shown in FIG. 1A, sending messages to, and receiving messages from, the TLTS 150. The TLTS 150 is connected to a Media Access Control ("MAC") device 158 via another SPI-4 protocol connection 160. The MAC 158 is connected to a network 162 via a suitable connection 164. The MAC converts between data for the TLTS (here, in SPI-4 format), and the physical signal used by the connection 164 for the network 162. The network 162 may have internal connections and branches, and communicates data to and from remote communications sources and/or targets, exemplified by as "source/target system 1" 170, "source/target system 2"180, and "source/target system 3" 190. Any number of communication source/targets may be accessed through a particular network. Source/target systems may be similar to the computing system 152. More complicated source/target systems may have a plurality of host and network connections, such as is illustrated in FIG. 1A. Thus, some source/target systems may effectively connect together a variety of different networks.

Figure 2:
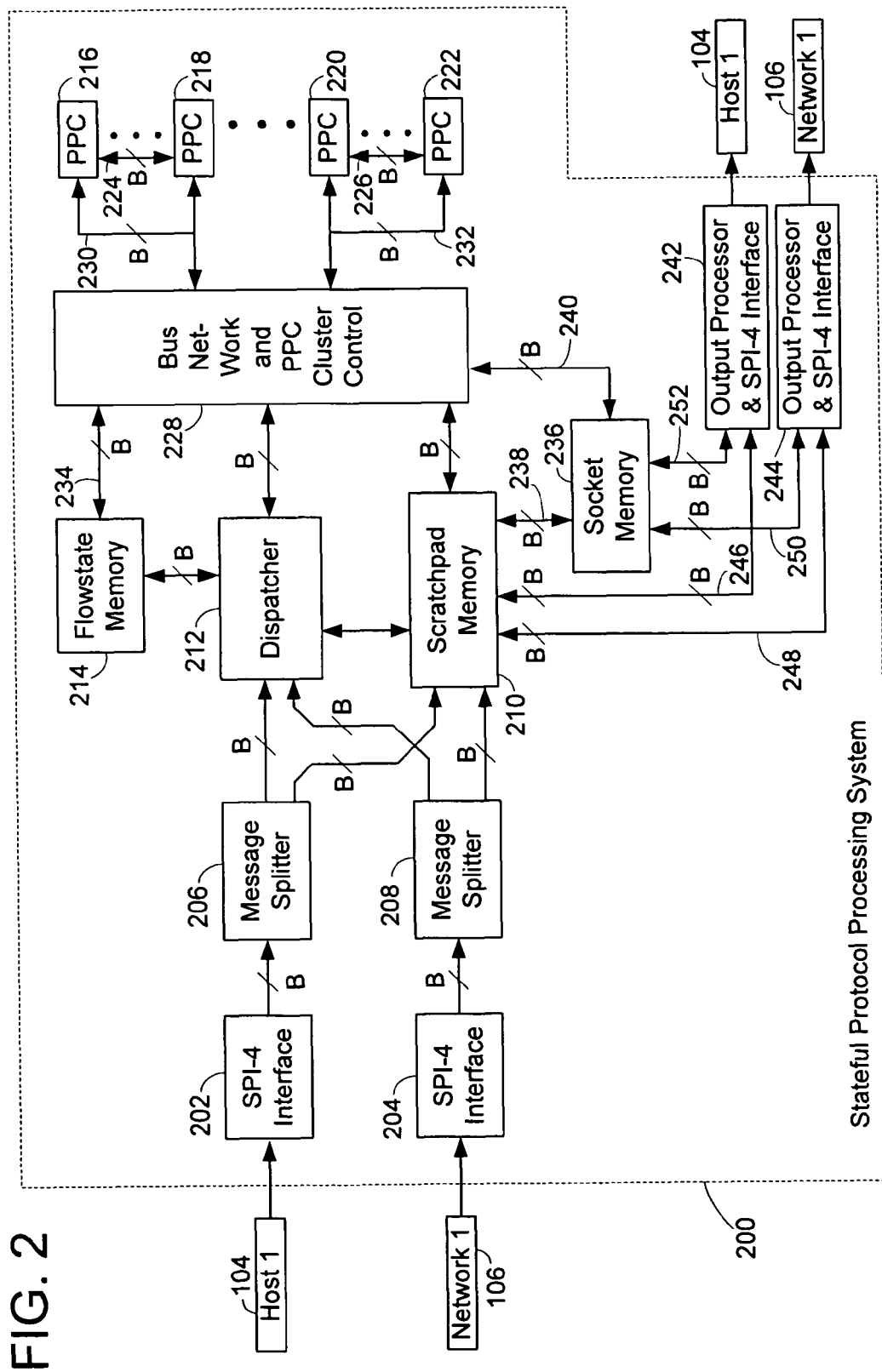
FIG. 2 is a more detailed block diagram of a stateful protocol processing system such as that of FIG. 1.

FIG. 2 is a block diagram showing modules of an exemplary SPPS 200. In one embodiment, two SPI-4 Rx interface units 202 and 204 receive data over standard SPI-4 16-bit buses that accord with "System Packet Interface Level 4 (SPI-4) Phase 2: OC-192 System Interface for Physical and Link Layer Devices. Implementation Agreement OIF-SPI4-02.0," Optical Internetworking Forum, Fremont, Calif., January 2001 (or latest version). The number of connections is important only insofar as it affects the overall processing capability needed for the system, and from one to a large number of interfaces may be connected. Each individual interface may process communications to any number of network and/or host sources; separate physical host and network connections are not necessary, but may be conceptually and physically convenient. Moreover, while SPI-4 is used for convenience in one embodiment, any other techniques for interface to a physical layer (e.g., PCI-X) may be used alternatively or additionally (with processing in the corresponding input blocks, e.g., 202, 204, conformed) in other embodiments.

II. Message Splitting

Still referring to FIG. 2, data received by the interfaces 202 and 204 is conveyed for processing to message splitter modules 206 and 208, respectively. The transfer typically takes place on a bus of size "B." "B" is used throughout this document to indicate a bus size that may be selected for engineering convenience to satisfy speed and layout constraints, and does not represent a single value but typically ranges from 16 to 128 bits. The message splitter modules 206 and 208 may perform a combination of services. For example, they may reorganize incoming messages (typically packets) that are received piece-wise in bursts, and may identify a type of the packet from its source and content and add some data to the message to simplify type identification for later stages of processing. They may also split incoming messages into "payload" data and "protocol event" (hereafter simply "event") data.

As the data arrives from the SPI-4 interface, a message splitter module such as 206 or 208 may move all of the data into known locations in a scratchpad memory 210 via a bus of convenient width B. Alternatively, it may send only payload data to the scratchpad, or other subset of the entire message. The scratchpad 210 may be configured in various ways; for example, it may function as a well-known first-in, first-out (FIFO) buffer. In a more elaborate example, the scratchpad 210 may be organized into a limited but useful number of pages. Each page may have a relatively short scratchpad reference ID by which a payload (or message) that is stored in the scratchpad beginning on such page can be located. When the payload overruns a page, an indication may be provided at the end of the page such that the next page is recognized as concatenated, and in this manner any length of payload (or message) may be accommodated in a block of one or more pages that can be identified by the reference ID of the first page. A payload length is normally part of the received header information of a message. The scratchpad reference ID may provide a base address, and the payload may be disposed in memory referenced to the base address in a predetermined manner. The payload terminates implicitly at the end of the payload length, and it may be useful to track the number of bytes received by the scratchpad independently, in order to compare to the payload length that is indicated in the header for validation. If the scratchpad also receives the header of a message, that header may be similarly accessed by reference to the scratchpad reference ID. Of course, in this case the payload length validation may be readily performed within the scratchpad memory module 210, but such validation can in general be performed many other places, such as within the source message splitter (206, 208), within the dispatcher 212, or within a PPC 216-222, as may be convenient from a data processing standpoint.

Event Derivation

A typical function of a message splitter 206, 208 is to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified. (Note that systems that perform stateful protocol processing may also process stateless messages. TLPs, for example, typically also process packets, such as Address Request Protocol or ARP packets, which are not associated with an established flow and thus do not affect a flowstate. Such "stateless" packets may be processed by any technique that is compatible with the presently described embodiments. However, these techniques are not discussed further herein because the focus is on the processing of stateful messages that do affect a flowstate for a message flow.)

The event that is derived from an incoming message by a message splitter module such as 206 or 208 may take a wide range of forms. In the simplest example, in some embodiments it may be the entire message. More typically, the event may exclude some information that is not necessary to make the decisions needed for TLP processing. For example, the payload may often be excluded, and handled separately, and the event may then be simply the header of a message, as received. However, in some embodiments information may be added or removed from the header, and the result may be reformatted, to produce a derived event that is convenient for processing in the SPPS.

Event Typing

Received messages may, for example, be examined to some extent by the interface (202, 204) or message splitter (206, 208) modules, and the results of such examination may be used to derive a "type" for the event. For example, if a packet has no error-checking irregularities according to the protocol called for in the flow to which the packet belongs, then the event derived from such package may be identified with an event "type" field that reflects the protocol and apparent validity of the message. Each different protocol that is processed by the SPPS may thus have a particular "type," and this information may be included in the event to simplify decisions about subsequent processing. Another type may be defined that is a message fragment; such fragments must generally be held without processing until the remainder of the message arrives. Message fragments may have subtypes according to the protocol of the event, but need not. A further event type may be defined as a message having an error. Since the "type" of the event may be useful to direct the subsequent processing of the event, messages having errors that should be handled differently may be identified as a subtype of a general error. As one example, error type events may be identified with a subtype that reflects a TLP of the event.

Any feature of a message (or of a derived event) that will affect the subsequent processing may be a candidate for event typing. Thus, event typing may be very simple, or may be complex, as suits the SPPS embodiment from an engineering perspective. Event typing is one example of augmentation that may be made to received message information in deriving an event. Other augmentation may include revising or adding a checksum, or providing an indication of success or failure of various checks made upon the validity of the received message. Relevant locations may also be added, such as a scratchpad location indicating where the message information may be found within the scratchpad memory 210. Note that if a message source that uses the SPPS, such as a host, is designed to provide some or all of such "augmenting" information within the message (e.g., the header) that it conveys to the SPPS, then the message splitter may not need to actually add the information in order to obtain an "augmented" event.

In addition to augmenting message information, event derivation may include reformatting the event information to permit more convenient manipulation of the event by the SPPS. For example, processing may be optimized for certain types of events (such as TCP events, in some systems), and deriving events of other types may include reformatting to accommodate such optimized processing. In general, then, events may be derived by doing nothing to a received message, or by augmenting and/or reformatting information of the message, particularly state-relevant information, to aid later processing steps. For TCP, for example, the resulting event may consist primarily of the first 256 bytes of the packet, with unnecessary information removed and information added to reflect a scratchpad location in which it is copied, the results of error checking, and the event typing. If a host is configured to prepare data in a form that is convenient, a resulting host event issued from the message splitter may be the first bytes of the message (e.g., the first 256 bytes), with few or no changes.

It may be convenient to implement the message splitter functions using an embedded processor running microcode, which lends itself to reprogramming without a need to change the device design. However, the message splitter function may alternatively be implemented via software executed in a general-purpose processor, or in an application specific integrated circuit (ASIC), or in any other appropriate manner.

Many alternatives are possible for the particular set of processing steps performed by message splitter modules such as 206 and 208. For example, a "local proxy" of the flow ID (i.e., a number representing the flow ID of the message that suffices to identify the flow within the SPPS and is more useful for local processing) could be determined and added to the event at the message splitter—a step that is performed during a later processing block in the illustrated embodiments. Also, it is not necessary that incoming messages be split at all. Instead, incoming messages may be kept together: for example, they may be stored intact in the scratchpad memory so as to be available to many parts of the system, or they may be forwarded in their entirety directly to the event dispatcher 212 and thence to the protocol processing cores (PPCs) 216-222 that are described below in more detail. If incoming messages are not split, then these modules 206, 208 might, for example, be renamed "packet preprocessors" to reduce confusion. The skilled person will understand that, in many cases, design convenience primarily determines which module performs any particular acts within a complex system.

Event Dispatcher

As shown in FIG. 2, the events prepared by the message splitters 206, 208 are forwarded to an event dispatcher module 212, where they may be entered into a queue. The event dispatcher module 212 (or simply dispatcher) may begin processing the incoming event by initiating a search for a local flow ID proxy, based on the flow identification "key" that arrives with the message.

Local Flow ID Proxy

The flow identification key (or simply "flow key") uniquely identifies the flow to which the message belongs in accordance with the TLP used by the flow. The flow key can be very large (typically 116-bits for TCP) and as such it may not be in a format that is convenient for locating information maintained by the SPPS that relates to the particular flow. A local flow ID proxy may be used instead for this purpose. A local flow ID proxy (or simply "local proxy ID," "local flow ID," or "proxy ID") generally includes enough information to uniquely identify the particular flow within the SPPS, and may be made more useful for locating information within the SPPS that relates to the particular flow. For example, a local flow ID proxy may be selected to serve as an index into a flowstate memory 214 to locate information about a particular flow (such as a flowstate) that is maintained within the SPPS. Not only may a local flow ID proxy be a more convenient representative of the flow for purposes of the SPPS, it will typically be smaller as well.

A local flow ID proxy may be determined within the dispatcher module or elsewhere, such as within the message splitter modules 206, 208 as described previously. Given the very large number of local flow ID proxies that must be maintained, for example, in large TLTSs (transport layer termination systems), determining the proxy ID may be a nontrivial task. If so, it may be convenient from an engineering perspective to make such determination by means of a separate "lookup" module, as described below. In some embodiments, such a lookup module may be a submodule of the message splitter modules 206, 208, or it may be a submodule of the dispatcher module, or it may be best designed as independent and accessible to various other modules.

A search for the local flow ID proxy may be simplified, or even eliminated, for events received from a host that is configured to include the local flow ID proxy rather than (or in addition to) the usual TLP flow key that will accompany flow messages on a network. Such a host configuration can reduce the workload of whatever module would otherwise determine the local flow ID proxy, e.g., the dispatcher. Another way to reduce the local flow ID proxy lookup effort may be to maintain a "quick list" of the most recently used flow IDs, and their associated proxies, and to check this list first for each arriving message or event.

If a message arrives that belongs to a flow for which no local flow ID proxy or flowstate is known, the dispatcher 212 may create a new local flow proxy ID. In many cases the dispatcher (or a lookup submodule) may then initialize a flowstate for such new flow. It may be useful to select such proxy ID as a value that will serve as a table entry into memory that may be used to store a flowstate for such new flow in a convenient memory, such as flowstate memory 214. Such memory may be quite large in large systems, requiring special management.

Memories

Each distinct "memory" described herein, such as the scratchpad memory 210 and the flowstate memory 214, typically includes not only raw memory but also appropriate memory controller facilities. However, the function of the memory controller is generally not central to the present description, which merely requires that the memory either store or return specified blocks of data in response to requests. Because SPPSs as described herein may be made capable of concurrently processing millions of active flows (or may be limited to processing a few thousand, or even fewer, active flows), and because a typical flowstate may be approximately 512 bytes, multiple GB of memory may be needed to implement the SPPS of FIG. 2. Techniques for implementing such large memories are known and constantly evolving, and any such known or subsequently developed technique may be used with any type of memory to form the SPPS of FIG. 2, so long as adequate performance is achieved with such memory. Memories are distinguished from each other as distinct memories if they function in a substantially independent manner. For example, distinct memories may be independently addressable, such that addressing a data item stored in one memory does not preclude simultaneously addressing an unrelated item in a distinct memory. Distinct memories may also be independently accessible, such that accessing an item in one memory does not preclude simultaneously accessing an unrelated item in a distinct memory. Due to such independence, distinct memories may in some cases avoid data access bottlenecks that may plague common (or shared) memories.

Lookup Submodule

The dispatcher module 212 illustrated in FIG. 2 may include submodules that perform particular subsets of the dispatcher tasks. For example, it may be useful to incorporate a separate "lookup" module to perform the function of looking up a local flow ID proxy based on the flow key that is included in the arriving event. Another function of the dispatcher 212 may be to establish and maintain flow timers for active flows, as may be required by the particular TLP associated with each flow. When it is convenient to maintain such flow timers in memory that is indexed by the local flow ID proxy, the lookup module may also conveniently perform the function of monitoring the flow timers. Also, the dispatcher 212 may provide the flowstate to a PPC when assigning it to process events of a flow. If the flowstate is similarly maintained in memory at a location indexed by the local flow ID proxy, then this may be another function that may conveniently be performed by the lookup module. Such a lookup module may be independent, or it may be essentially a submodule of the dispatcher. The lookup module could also be associated primarily with other sections of the system. For example, it could be primarily associated with (or even a submodule of) a message splitter module 206, 208, if that is where the lookup tasks are performed, or it could be primarily associated with the PPCs 216-222 if the lookup tasks were performed primarily there.

The lookup process may require extensive processing, such as a hash lookup procedure, in order to select or determine a local flow ID proxy based on raw flow identification or "flow key." As such, a lookup module (or submodule) may be implemented with its own microprocessor system and supporting hardware. When flow ID proxy determination is performed by a lookup module (or submodule), the dispatcher may assign and transfer an event to a PPC without waiting for the determination to be completed, and the lookup module can later transfer flow information (obtained by use of the local flow ID proxy) to the assigned PPC without further interaction with the dispatcher.

Once a "lookup" or other submodule is established as a distinct entity, it may as a matter of design convenience be configured to perform any of the tasks attributed to the dispatcher (or other module in which it is located or with which it is associated, and indeed in many cases may perform tasks that are attributed, in the present description, to other modules, such as the message splitter modules. The ability to move functionality between different functional modules is a common feature of complex processing systems, and the skilled person will understand that moving functionality between modules does not, in general, make a system significantly different.

Many other functions may be performed by the dispatcher 212, or by its submodules. For example, the dispatcher may request a checksum from the scratchpad memory 210 reflecting the payload of the message, combine it with a checksum included with the event that covers that portion of the message converted into the event, and incorporate the combined checksum into the event. A bus of modest size is shown between the dispatcher 212 and the other processing blocks that is sufficient for this purpose. As with many dispatcher functions, this function could be performed elsewhere, such as in the message splitter blocks 206, 208, or during later processing.

Director Submodule

Another module, or dispatcher submodule, may be created to perform some or all of the decision making for the dispatcher. Such submodule, which will be referred to as a "Director," may perform the steps involved in selecting a particular PPC to handle a particular event of a flow, and keeping track, for the overall SPPS (stateful protocol processing system), of the status of active flow processing in the various PPCs.

The "flow processing status" maintained by the Director submodule may indicate, for example, that other events of the flow are presently being processed by a PPC, or that a new flowstate generated after PPC processing of a previous event (of the flow) is presently being written to the flow state memory. It may also indicate if the flow is being torn down, or that a timer event is pending for that flow. Such flow processing status information may be used, for example, to cause the Director submodule to delay the forwarding of an event to a PPC when appropriate, such as to avoid overwriting a flowstate while the flow processing status of a flow says that its flowstate is being written from a PPC to the flowstate memory. Once the update of the flowstate memory is complete, as reflected by the flow processing status, the new event may be forwarded to a PPC.

The Director submodule's flow processing status information may also be used, for example, to prevent timer expirations from being improperly issued while a flow is being processed by a PPC. Such timer events should not be issued if the very act of processing an event may cause such a timer expiration to be cancelled. The Director submodule may refer to the flow processing status information before allowing timer events to be issued to PPCs, so that such timer events are issued only when no other events are active for that flow. As with the lookup submodule, organization of the Director as a distinct module may permit the dispatcher to simply hand off an incoming event to the Director.

Protocol Processing Cores and Buses—Structural Introduction

Having established a local flow ID proxy for a message, the dispatcher 212 determines where the message event (or entire message, if messages and events are not split) should be processed in accordance with the TLP associated with the flow. In some embodiments, the bulk of such TLP processing is performed by a Protocol Processing Core ("PPC"). A cluster having a number of PPCs is represented by the PPCs 216 through 218, while PPCs 220 and 222 represent another cluster of PPCs. Two PPC clusters are shown, but any number of such PPC clusters may be used. For example, one TLTS embodiment may comprise only a single cluster of PPCs, while a complex SPPS embodiment may include hundreds of clusters. Two of the PPCs in a cluster are shown in FIG. 2, but two or more PPCs may be used in any given cluster, with five PPCs per cluster being typical. Though it may be convenient for design symmetry, the number of PPCs in each cluster need not be identical. The particular organization of PPCs into clusters is selected, in part, to facilitate the transfer of data by reducing bus congestion. Each cluster may utilize an intracluster intercore bus 224 (or 226) interconnecting PPCs of each cluster, and each cluster will typically be connected to a bus network and control block 228 by a bus 230 or 232. Data between the dispatcher 212 and the PPCs may be organized by a bus network and control block 228. The bus network and control block 228 functions primarily as a "crossbar" switch that facilitates communication between a variety of modules, as described in more detail below.

PPCs (e.g., 216-222) typically include a processor core and microcode (i.e., some form of sequential instructions for the processor core) that enables the PPC to process events that are submitted to it. They also typically include local memory, which the PPC can access without interfering with other PPCs, sufficient to hold the relevant flowstate data of a flow that the PPC is processing. It will typically be convenient to maintain much or all of the flowstate of a particular flow in the local memory of the PPC processing a message event for that flow. The PPC local memory may be organized into a number of blocks or "workspaces" that are each capable of holding a flowstate. PPCs will typically have a queue for incoming events, and workspaces for several different flows having events in the queue that are concurrently being processed by the PPC.

The buses represented herein are described as being bidirectional in nature. However, if convenient, the buses may be implemented as two one-way buses that in some cases will not be of equal bit-width in both directions. Thus, a bus indicated as having a width B bits represents a bus width that that may be selected for convenience in a particular implementation, and may be directionally asymmetrical. The typical considerations for bus size apply, including space and driver constraints of the physical layout, and the required traffic needed to achieve a particular performance target. The buses are not shown exhaustively; for example, a message bus may usefully be connected (for example by daisy-chaining) between all of the physical pieces of the TPTS, even though such a bus is not explicitly shown in FIG. 2. Moreover, if the SPPS is implemented as program modules in software or firmware running on a general processing system, rather than in a typical implementation that employs ASICs having embedded microprocessors, the buses represented in FIG. 2 may represent data transfer between software modules, rather than hardware signals.

Assigning Events to a PPC

In some embodiments of the present invention, the dispatcher 212 selects a particular PPC to process events associated with a particular flow. There are a number of considerations for such assignment. First, the PPC must be one of the PPCs that are compatible with, or configured to process, events of the type in question. Such compatibility may be determined in the dispatcher, or in a flow processing status subsystem of the dispatcher, by means of a table of PPCs that indicates the event types or protocols the PPC is compatible with, which may in turn be compared with the protocol or event type requirements of the incoming event. In some embodiments the event is marked with an indication of its "type" at another stage of processing, for example in the message splitter module. The dispatcher then needs only select a PPC that is compatible based on the predetermined "type" of the event. Typically, the event types will be so defined that all messages having state-relevant information for a particular flow will also have the same event type, and can be processed by the same PPC. Thus, a PPC will be selected from the constellation of PPCs that can process the indicated event type.

A PPC is selected from this constellation of compatible PPCs according to an algorithm that may, for example, compare PPC loading to find a least-loaded PPC, or it may select a PPC in a round-robin manner, or it may select PPCs randomly. Typically, events of each flow are specifically directed to a PPC, rather than being directed to a PPC as a member of a class of flows. Such individualized processing of each flow permits load balancing irrespective of the attributes of a class of flows. When flows are assigned as members of a class, such as one that shares certain features of a flow ID (or flow key), it may happen that a large number of such a class needs to be processed concurrently, overwhelming the capacity of a PPC, while another PPC is unloaded. This effect may be accentuated when flows are assigned to PPC in classes that have a large number of members. While many embodiments assign each flow uniquely (in a class size of one), it may be effective in some embodiments to assign flows in classes, particularly small classes or classes whose membership can be changed to balance loading.

Similar effects for load balancing may be achieved, even if flows have been assigned in a large class, if a mechanism is provided for releasing specific flows from assignment to particular PPCs. In many embodiments, both assignment and release of flows to PPCs is done for individual or specific flows. Finally, even if both assignment of flows to a PPC, and release of flows from a PPC, is performed for classes of flows, an equivalent effect may be achieved by making the classes flexibly reassignable to balance loading. That is, if the class that is assigned to a PPC can be changed at the level of specific flows, then loading can be balanced with great flexibility. In each case it is possible to change the flows assigned to a PPC in singular units, such that a flow is ultimately assigned to a PPC essentially irrespective of any fixed class attributes, such as characteristics that hash a flow ID to a particular value, and similarly irrespective of other flows that may be assigned to that PPC (or to another PPC).

After selecting a PPC, the dispatcher 212 forwards the event to the PPC together with instructions regarding a flowstate "workspace." As mentioned above, the decisions for selecting a PPC may be performed in the Director submodule of the dispatcher. In a typical embodiment, the dispatcher 212 first determines if an incoming event belongs to a flow that already has events assigned to a particular PPC. A submodule, such as a Core Activity Manager that tracks the activity of PPCs, may perform this determination in some embodiments, while in others embodiments the Director submodule may perform these functions. In the case that a PPC is already assigned for events of the flow of the incoming event, the incoming event is typically forwarded to the same PPC, which may already have the flowstate present within its local memory.

However, if no PPC is presently assigned to the flow, then the dispatcher selects a particular PPC, for example the PPC 216, to process the incoming event (or assigns the flow to the particular PPC). Selection may be based upon information of the Core Activity Manager, which maintains activity status that can be used to balance loading on the various (compatible) PPCs. The Director submodule may perform the actual assignment and balancing decisions, and in some embodiments the Director and the Core Activity Manager are substantially a single submodule having a dedicated processor and program code to perform these tasks. The assignment may be simply "round robin" to the compatible PPC that has least recently received an event, or on the basis of PPC queue fullness, or otherwise.

After a PPC 216 is assigned to process the incoming event, a workspace is selected in the local memory of the PPC 216 and the current flowstate of the flow of the incoming event is established in the selected workspace. Selection of the workspace may be done by the dispatcher module (for example, by its Director submodule), or otherwise, such as by the PPC on a next-available basis. The flowstate may be established in the selected workspace in any convenient manner. For example, the dispatcher may send the flowstate to the PPC via the dispatcher (e.g., as an action of the lookup submodule), or the PPC itself may request the flowstate from a memory (e.g., the flowstate memory 214). The event is typically delivered from the dispatcher 212 to an input queue of the PPC 216, and is associated with the selected workspace. Also, separately or as part of the event, the size and location of the data payload in scratchpad memory (if any) is typically conveyed to the PPC 216. Having this information, the PPC 216 will be able to process the event when it is reached in the queue, as described subsequently in more detail. When the PPC 216 finishes processing a particular event, it will, in some embodiments, transmit a "done" message to the dispatcher 212, so that the dispatcher can track the activity of the PPC. A submodule such as the Core Activity Module or the Director may, of course, perform such tracking.

Counting Events to Track Active Flow Processing

Having transmitted an event to a selected PPC (216), the dispatcher 212 increments an event counter in a location associated with the flow (and thus with the PPC 216). The event counter may be maintained in a local memory block, associated with the local flow ID proxy, that is reserved for such information about current PPC processing (e.g., in the core activity manager within the dispatcher), or in another convenient location. The event counter is incremented each time an event is sent to the PPC, and is decremented each time the PPC returns a "done" message for that flow. As long as the event counter is non-zero, a PPC is currently processing an event for the associated flow. When the event counter reaches zero for a particular flow, the PPC (216) no longer has an event to process for the particular flow, and those of its resources that were allocated for processing the particular flow may be released to process other flows. Note that the PPC 216 may be processing events of other flows, and that its release from processing the particular flow may be made irrespective of such other flows.

If the event counter associated with the flow of an event arriving at the dispatcher 212 is not zero, then it may be preferable to assign and transfer the arriving event to the same PPC. In some embodiments, if a PPC is already processing an event, the global (i.e., flowstate memory 214) version of the flowstate is no longer valid. Rather, only the flowstate in the PPC workspace is valid. In such embodiments, the valid flowstate in the present PPC workspace should be made available to a subsequently selected PPC, which in turn should be done only after the present PPC is finished processing the event. Accordingly, at least in such embodiments, it will generally be more convenient to assign the same PPC to process arriving events belonging to a selected flow until that PPC completes all pending events for the selected flow.

An event arriving at the dispatcher 212 for a specified flow that is already assigned to a PPC may sometimes need to be transferred, or assigned to a different PPC. In such a case it may be convenient to retain the event in the dispatcher 212 until the current PPC completes processing all events it has been assigned. Holding the event in the dispatcher 212 avoids the need to coordinate two PPCs that are simultaneously updating a flowstate for the particular flow. Before such handover occurs, it may also be convenient to allow the PPC to "check-in" its workspace (memory reflecting the present flowstate) to the Flow Memory before assigning the new PPC. Alternatively, the workspace may be transferred from the current PPC directly to the new PPC after all events of the current PPC queue have been processed.

If an event arrives at the dispatcher for a flow that is active, but the related event counter is zero when an event arrives at the dispatcher 212 (indicating that no PPC is presently assigned to the flow), then the dispatcher (or its Director submodule) will select a PPC that is available to process that event type. The selection is typically independent of previous processing, and may be based on various factors such as load sharing and event-type processing capability. As such, the PPC selected next will likely differ from the PPC that previously processed events belonging to the flow. However, in some embodiments consideration may be given to previous processing of a particular flow by a particular PPC, such as when the PPC in fact retains useful state information. Once the PPC selection is made, processing continues as described previously, with the event conveyed to the new PPC, and the flowstate disposed in a local workplace selected within the PPC. The dispatcher 212 either transfers the current flowstate to the new PPC or indicates where in the flowstate memory 214 the present flowstate is to be found.

An event counter is just one means that may be used to determine whether a particular PPC is presently processing a previous event of the same flow. Alternatively, for example, the PPC presently processing an event of a flow might flag the dispatcher 212 when it finds no events in its input queue associated with an active workspace. Any other appropriate procedure may also be used to determine whether a PPC is presently assigned to processing a particular flow.

Updating Flowstate and Releasing a PPC

A PPC may be released from responsibility for processing events of a particular flow after the associated event counter reaches zero. Such a release means that the PPC may be assigned to process events of a different flow, since it will generally therefore have a workspace free. In general, the PPC may be processing other flows at the same time, and the release does not affect the responsibilities of the PPC for such other flows. In the typical circumstance that the event counter (or other indication) shows that events of a particular flow may be reassigned to another PPC for processing, the SPPS is enabled to balance PPC processing loads by shifting specific individual flows between different PPCs (of those able to handle the event types of the flow) independently of other flows that may be handled by the PPCs. As compared with techniques that cause PPCs to handle events for a class of flows (such as a class of flows whose flow keys have certain characteristics), such independent flow assignment may reduce the statistical probability that one or more PPCs are idle while another PPC is processing events continuously.

Before a PPC is released, the flow memory that has been updated by the PPC (216) is stored where it will be available to a different PPC that may be selected at a later time to process the same flow. This may be accomplished in any appropriate manner, for example by transferring the contents of the relevant PPC workspace to the dispatcher 212 and thence to the flowstate memory 214. Alternatively, the PPC (216) may convey the flowstate information to a known location in the flowstate memory 214 in cooperation with the dispatcher 212, so that the dispatcher is aware that the flowstate has been updated and is ready for future access. The flowstate may be conveyed more directly from the PPC (216) to the flowstate memory 214, such as via a bus 234 from the bus network and control block 228. The bus 234 may be used for either "checkout" of a flowstate from the flowstate memory 214 to a PPC, or for "check-in" of an updated flowstate from a PPC to the flowstate memory 214. When the event counter reaches zero, and the flowstate has been checked-in to the flowstate memory 214, the present PPC may be released and the flow will revert to a condition reflecting that no PPC is currently assigned to it. Within the PPC, the flowstate workspace may be indicated as free.

An alternative to storing flowstates in the flowstate memory 214 may be used in some embodiments. For a SPPS that is provided with sufficient memory local to the PPCs, the flowstate may be maintained in a workspace of the last PPC that processed it until such time as it is needed elsewhere, such as in another PPC. In such embodiments, the flowstate may be transferred to the appropriate workspace in the new PPC via an intra-cluster bus such as 224 or 226. This is more likely to be a practical alternative for small SPPSs that handle a limited number of concurrent flows.

Socket Memory and Output Processing

In TLP applications that guarantee message delivery, for example TCP, one requirement is the confirmation that a sent message was correctly received. In these TLPs, if the message is not correctly received, the message should be retransmitted. Because it may be some time before a request for retransmission arrives, transmitted messages need to be maintained in memory (e.g., in a "send buffer") for some period of time. Send buffering may be required even before first transmission, for example when the output target (e.g., Host1 104 or Network 1 106 in FIG. 2) is not ready to accept data. Similarly, a "receive buffer" is frequently required. For example, messages may be received out of order, or as fragments, and these must be saved for a period of time to comply with TCP rules that require completing the messages and putting them in the correct order. While messages could simply be stored in the scratchpad memory 210, for large systems entailing large send and receive buffers, it may be more convenient to establish a separate "socket memory" 236 to store large quantities of data for somewhat extended times. Such a socket memory 236 may interface with the scratchpad memory 210 via a bus 238 as shown in FIG. 2, and with the bus network and PPC cluster control 228 via another bus 240. (Due to substantial traffic, in some embodiments, the bus 240 may actually comprise several individual bus structures.)

The socket memory 236 may provide data intended for output to an output processor and SPI-4 Interfaces 242, 244 via buses 246 and 248. However, when data to be output is still present in the scratchpad memory 210, in some instances it may be quicker to provide the data to the output processors 242, 244 directly via buses 250, 252. The output processing may include tasks such as the preparation of message headers, primarily from the event data, calculation of checksums, and assembly of completed output messages ("reassembly"). The event typically retains some type of TLP or event type identification, and the output processors may use this information to determine the proper format for headers, cyclic redundancy checks (CRCs) and other TLP bookkeeping information. After a message is reassembled by the output processor, the SPI-4 portion of the output units 242 and 244 formats the message according to the SPI-4 (or other selected) interface protocol, so that the data may be output to the same connections (for example "Host 1" 104 and "Network 1" 106), from which data is received at the input to the SPPS.

Protocol Processor Core Functions

Once a PPC has received an event of an appropriate type, and has information reflecting the size and location of any payload, it may direct treatment of the entire message in accordance with the TLP being used. The PPC may direct actions regarding the flow to which the event belongs, e.g. requesting retransmission, resending previously transmitted messages, and so on, and may update the flowstate for the flow as is appropriate. In some embodiments, traffic congestion can be reduced if the PPCs do not physically transfer messages directly to the output processors (242, 244), but instead simply direct other circuits to transfer the messages for reassembly at the output processors 242, 244.

Some outgoing messages contain very little information (e.g., little or nothing more than a header), such as acknowledgements or requests for retransmission. In these cases, the PPC that is processing the event (e.g., PPC 216) may form a header based upon the event information and pass it to the socket memory 236. The socket memory 236 may, in turn, do little or nothing to the header information before passing it on to one of the output processors 242, 244. Other outgoing messages will include a substantial payload, which may, for example, have been received with an incoming message and stored in the scratchpad memory 210. The PPC may direct such payloads to be moved from the scratchpad memory 210 to the socket memory 236, and may separately direct one of such payloads to be concatenated, for example in one of the output processors 242, 244, with an appropriate header formed by the PPC. The skilled person in the computer architecture arts will recognize that the PPC can control the output message and flowstate information in many ways.

PPCs may be implemented in any manner consistent with their function. For example, a microprogrammable processor provides one level of flexibility in processing varying communication needs. Some or all PPCs could alternatively be implemented as fixed state machines, in hardware, possibly reducing circuit size and/or increasing processing speed. Yet again, some or all PPCs may comprise embedded microprocessors that are operable out of program memory that can be modified "on the fly," even while the SPPS is active. Such an implementation permits adjusting the number of PPCs able to process particular types of events, adding further load-balancing flexibility. PPCs may be configured to process some stateful protocols, and not others, and the configuration may be fixed or alterable. For example, in a PPC based on a microprogrammable processor, the microprogram (or software) typically determines which event types, or protocols, the PPC is configured to process. A PPC is "compatible" with a particular event type, or protocol, when it is configured to process such event types, or to process messages (events) according to such a protocol.

Bus Network and PPC Cluster Control

Figure 3:
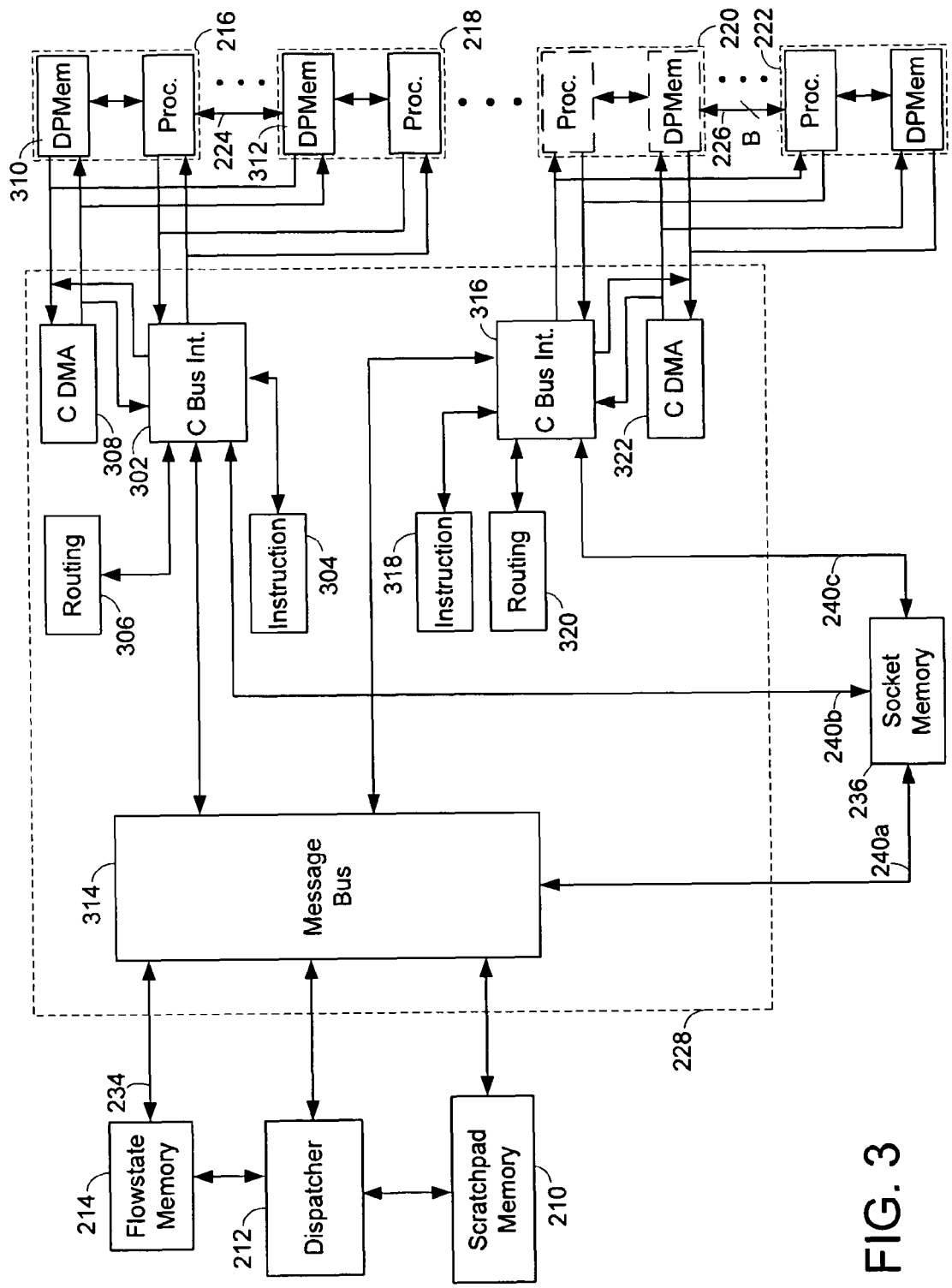
FIG. 3 is a block diagram showing further details of some of the features of the stateful protocol processing system of FIG. 2.

FIG. 3 illustrates an exemplary architecture for the bus network and PPC cluster controller 228 of FIG. 2. In this embodiment, the cluster of PPCs (from 216-218) is controlled in part via a cluster bus interface 302. Through the cluster bus interface 302, instructions are available for all of the PPCs (216-218) in the cluster from an instruction memory 304, typically implemented using RAM. The cluster bus interface 302 may also provide access to a routing control table 306 for all of the PPCs in the cluster. A cluster DMA controller 308 ("C DMA") may be provided, and may have an egress bus that delivers data from a FIFO of the DMA controller 308 to the cluster bus interface 302, as well as to one side of a dual port memory (e.g., the DPMEM 310, 312) of each of the PPCs 216-218 of the cluster. The DPMEM 310, 312 is accessible on the other side from the DMA controller to the corresponding processor with which it is associated as part of a PPC 216, 218. As shown in FIG. 3, the cluster DMA controller 308 may have a separate ingress bus by which the FIFO receives data from the dual port memory (e.g., the DPMEM 310, 312) and from the cluster bus interface 302. The DMA controller 308 may be used, for example, to transfer flowstates between the PPC local memory and the flowstate memory 214. As shown in FIG. 3, the cluster bus controller 302 also provides bidirectional bus connections to a message bus 314, and a further bidirectional bus connection 240b to the socket memory 236. Some or substantially all of the local memory of a PPC may be DPMEM such as the DPMEM 310, but any suitable local memory may be used instead, as may be convenient for design and fabrication.

The bus 240 interconnecting the socket memory 236 and the bus network and PPC cluster control 228 is shown in FIG. 3 as being implemented by three distinct bidirectional buses: the bus 240a interconnecting the socket memory 236 and the message bus 314; the bus 240b as mentioned above; and the bus 240c to a further cluster bus interface 316. The cluster bus interface 316 operates with respect to the cluster of PPCs 220-222 analogously to the cluster bus interface 302, as a crossbar switch to facilitate communication between the PPCs and the message bus 314, the socket memory 236, and to provide access to common instruction memory 318 and a routing table 320. A further cluster DMA 322 similarly manages data flow between the dual port memory of the PPCs 220-222 and the cluster bus interface 316. Further sets of similar modules (routing, instruction, cluster bus interface and cluster DMA) may, of course, be provided and similarly interconnected.

The skilled person in the computer architecture arts will appreciate that any suitable bus control may be used to implement the connections shown for the bus network and PPC cluster control 228. For example, the routing and instruction information may be maintained within individual PPCs. In addition, the PPC memory need not be dual-port, nor is a DMA controller such as 308 or 322 necessary. In somewhat less complex embodiments, the cluster bus interfaces 302, 316 may simply be part of the message bus 314, or the interfaces may be omitted entirely. Conversely, even more elaborate bus architectures may be employed to increase the speed and power of some embodiments.

Flow Processing with Alternate Protocol Processing Cores

Figure 4:
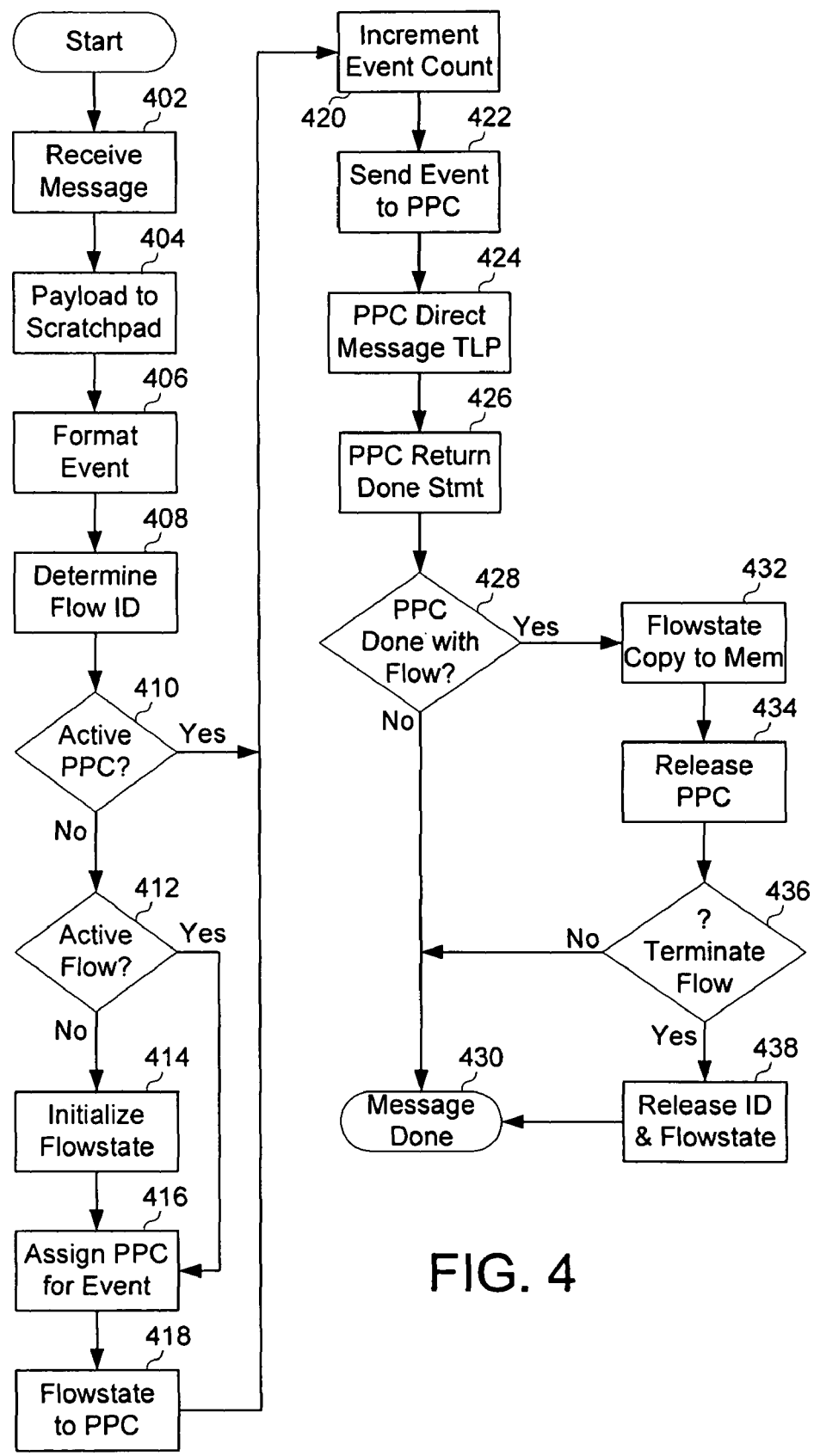
FIG. 4 is a flowchart of acts used in varying the processor core that is selected to process a flow.

FIG. 4 is a flowchart showing acts that may be performed by an exemplary SPPS to perform stateful protocol processing of messages belonging to a flow, generally alternating PPCs (protocol processing cores), that is, using different PPCs at different times. As shown in FIG. 4, at a step 402 a message is received. This step may include various substeps, such as reconstructing complete messages from packet fragments, performing validity checks, and/or establishing checksums. Next, at a step 404, the payload of the message may be moved to a scratchpad memory. The step 404 is optional, insofar as it indicates splitting the message and storing part of the message in a temporary memory location that is especially available to both input and output processing facilities. Alternatively, for example, the message may be kept together, and/or it may be moved directly to a more permanent memory location.

Proceeding to a step 406, an event portion of the message may be defined. Event definition typically includes the state-relevant portion of the message, and may entail reformatting a header of the message and adding information, such as checksums and event type indication, to facilitate further processing of the event, as discussed in more detail hereinabove. If the message is not split, the "event" may include the payload information, and may even be an incoming message substantially as received. Processing of the event proceeds at a step 408 where data contained within the event that uniquely identifies the flow (the "flow key") is examined to begin a process of determining a location of flowstate information and a local flow ID proxy. A decision step 410 checks whether a PPC is actively processing an event of the same flow. This check may be effected by searching for the flow key in a local "active flow" table. If the flow key is found in the "active flow" table, then a PPC is presently processing another event belonging to the same flow, and the process exits the decision step 410 on the "yes" branch. If the flow is not active (e.g., if the flow key of the flow is not found in the "active flow" table), then processing continues at a decision step 412. Other techniques may be used in the step 410 to determine if events associated with the flow key are presently being processed by any PPC, such as searching an area of memory reserved for the status of message flows that are presently being processed by a PPC (e.g., within a dispatcher's Core Activity Management submodule). Alternatively, for example, a single flow-state location may be examined for an indication (e.g., a flag) that processing is in progress at a PPC. Further techniques and criteria for determining whether a PPC is actively processing the flow are described below with reference to a decision step 428.

At the decision step 412 a check is made as to whether the flow associated with the flow key is active at the SPPS. This may be performed by checking for a valid flow location in a flow memory that maintains flowstates for active flows when no PPC is presently processing events of the flow. (Since the number of active flows can be very large, the flow memory is typically distinct, separately accessible, and much larger, than the local flow table used for flows presently being processed by a PPC.) This step typically includes a "lookup" task of determining a local flow ID proxy related to the flow key, a task which may involve processing the flow key information according to hash algorithms. Once the local flow ID proxy is determined, it can generally be used to locate an existing flowstate for the flow corresponding to the flow key. The mere existence of a valid flowstate may cause an affirmative result at the decision step 412.

If the flow is not active at all, so that no valid flowstate exists in either general flowstate memory or in a PPC actively processing a flow, then the process proceeds to an initialization step 414 to create and initialize a valid flowstate area within flowstate memory. Note that some stateless "events" exist that do not require a flowstate, such are Address Resolution Protocol (ARP) events which do not belong to a flow, and for which no flow need be created. ARP, and other such "stateless" events, may be processed independently of the processing steps of FIG. 4, which are primarily relevant to "stateful" events.

Once an active flow is established (whether located at the decision step 412, or initialized at the initialization step 414), the method may proceed to assign a PPC to process the event at an assignment step 416. This step may involve several substeps, such as determining and identifying which PPCs are compatible (i.e., capable of processing events of the present type) and available (e.g., have room in their queues) to process the event. A PPC may be selected from those satisfying both of these criteria in many ways, such as in a round-robin fashion, or by selecting the least full PPC local queue, or randomly, or by other load balancing algorithms. Because the PPC has just been newly assigned to process the event, the flowstate is made available to the PPC at a step 418. The flowstate may be delivered by the dispatcher (or submodule) as described above; or, if a global flowstate memory is shared with the assigned PPC, then this step may comprise identifying the flowstate memory location to the PPC. The step 418 also typically includes identifying the location of a "workspace" where the PPC can access the flowstate during processing. Such workspace is typically maintained locally at the PPC, but in some embodiments may be maintained more globally, or split to be both local and global.

Once a PPC has been assigned and has a valid flowstate, which occurs after the step 418 (or after an affirmative step 410), processing proceeds at the steps 420 and 422. Step 420 tracks the activity of a PPC processing a flow. In one embodiment of the present invention, step 420 includes incrementing an event counter associated with the assignment of the PPC to process the flow, but alternatives are described below with regard to the decision step 428.

At a step 422 the contents of the event are provided to the assigned PPC. This may be accomplished by physically copying the event contents to a queue in the local memory of the PPC, or, as an alternative example, by identifying a location of the event data to the PPC. Such queue may contain events from different flows, for example from as many different flows as workspace storage is available for corresponding flowstates. If either event queue or flowstate workspace is not available in (or for) a compatible PPC, then the dispatcher may temporarily withhold effecting part or all of the event/workspace transfer to the PPC.

Once transfer is completed, the assigned PPC has access to the flowstate of the flow, and to the event data, which typically includes information regarding the size and location of the payload associated with the event. At a step 424, the PPC may perform much of the transport layer protocol processing for the message that is associated with the event. The protocol defines the net effect that such processing must achieve, but of course the effect may be accomplished in any manner either presently practiced or later developed for such transport layer processing. Actions by the PPC may include, as examples, updating the flowstate, creating a header for a message to be output, directing that a previously transmitted message be retransmitted, or sending a request for retransmission of a message that was received with an error. Actions by the PPC may also include directing the reassembly of a header it constructs to a received payload, and transmission to a different TLTS connected to the network at another end of the flow, or to a local host. Upon completing the event, a done statement is asserted at a step 426. In one embodiment, the done statement is returned to a global dispatcher used to track PPC activity.

Releasing an Active PPC

After the PPC completes processing the present event, a determination is made at a decision step 428 whether the PPC has completed all processing for the flow to which the event belongs. In one embodiment, such determination may be made by a dispatcher module decrementing an event counter associated with a PPC in response to a "done" statement, and determining that the event counter has reached zero. However, many alternatives for establishing that a PPC is done with the flow will be appropriate in different embodiments. For example, a PPC may be considered "done" with a flow when it completes processing the last event of that flow that exists in its queue. As another example, the PPC may be considered done with a flow when the flowstate in its local memory is overwritten or invalidated by processing in another PPC. These, or other definitions of "done," may be tracked in one (or more) of various places, such as within the PPC itself, or at a more global module such as a dispatcher (e.g., within a core activity manager submodule).

If, at the decision step 428, the PPC is determined to be actively processing the flow, the method may proceed to a conclusion step 430 with no further processing, since the flowstate local to the PPC has been updated and the global flowstate need not necessarily be updated. However, upon determining that the PPC is done with processing the flow, the local flowstate that has been updated at the PPC is transferred to a more global flowstate location at a step 432, so that the PPC workspace becomes available for processing events of a different flow. The global flowstate can then be subsequently accessed when further events arrive that belong to the flow. The PPC may be deemed "done" based on event processing completion for the flow as determined by the dispatcher, by a submodule or other module, or by the PPC itself. The "done" designation may also be postponed after the processing of all events from the flow is completed, for example until the PPC has no other room for new flows and events. Once the PPC is deemed "done" at a step 434, the PPC may be released from "assignment" to processing the flow, which may, for example, include setting a flag that indicates that the flowstate memory in the PPC is no longer valid, or is available for further storage of a different flowstate. After the step 434, the PPC will be treated as free of the event, and of the flow to which the event belongs.

A decision step 436 will typically occur at some point to determine whether the last event processed by the PPC permits the flow to be completely closed. This decision step 436 may be made even before the occurrence of the decision step 428, or before the steps 432 and/or 434, because such a decision to terminate the flow may obviate a need to write the flowstate to memory. Such a decision may also subsume the decision that the PPC is "done" with the flow. However, for processing convenience, the termination decision may be considered as occurring in the sequence shown in FIG. 4. The PPC itself will typically determine, as part of its TLP processing duties, whether the last event completed the flow (e.g., whether the flowstate is advanced to the "connection closed" condition). However, a decision to actually close the flow may be made more globally, such as at the dispatcher (or a submodule). If it is determined at the decision step 436 not to terminate the flow, the system is generally done processing the message and proceeds to the done step 430. However, if it is determined at the step 436 to terminate the flow, the local flow ID proxy and flowstate memory location may thereupon be released for other uses. Since PPCs are generally assigned to, and released from processing events belonging to a flow at the level of a specific flow, largely irrespective of where other flows are assigned (at least within the universe of compatible PPCs), it is possible, indeed highly probable, that a PPC is assigned to process events (or messages) belonging to a flow that was previously processed by another PPC. Such flow-PPC reassignments may be rather frequent, and under some circumstances may even occur for each event of a flow.

Dispatcher Processing

Figure 5:
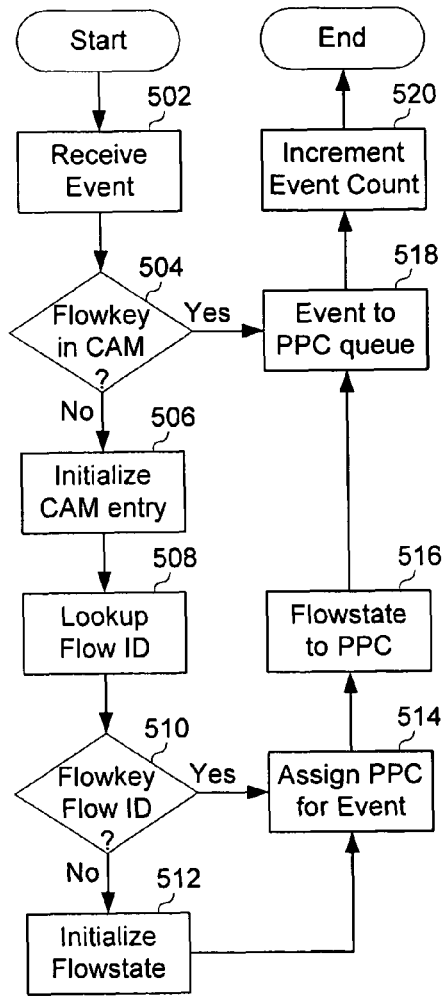
FIG. 5 is a flowchart of acts performed by a dispatcher module in response to receiving an event belonging to a flow.

FIG. 5 is a flowchart showing acts that may be taken by a "dispatcher" module within an exemplary SPPS to dispatch events belonging to a flow to different PPCs at different times. FIG. 5 is focused on acts, which may be generally attributed to a dispatcher module (and submodules), to effect distribution of incoming events. Thus, FIG. 5 steps may substantially be a subset of steps of the overall SPPS, such as are illustrated in FIG. 4, although FIG. 5 steps are from the dispatcher module perspective and may also include different details than are shown in FIG. 4. The dispatcher module is conceptually separate from the PPCs to which it dispatches events, and from input processing from which it receives events, and may be connected within a SPPS like the dispatcher 212 in FIG. 2, or may be otherwise connected. The dispatcher module may also be conceptually or even physically subdivided; for example, reference is made to a local flow ID proxy (and/or flowstate) "lookup" module, and to a Director Core Activity Manager, each of which may either conceptually or physically be a submodule of the dispatcher module, or an ancillary module associated with the dispatcher.

As shown in FIG. 5, at a step 502 an event is received from an input source. The event will typically contain only a "state-relevant" part of a message being processed by the SPPS. That is, the event will typically contain only the information necessary for a PPC (protocol processing core) to control the maintenance of the flowstate of the flow associated with the message, and not the payload of the message. However, in some embodiments the payload, or parts of it, may be kept with the state-relevant data. The dispatcher examines a "flow key" contained within the event that uniquely identifies the flow to which the event belongs. At a step 504, the dispatcher searches for a match to the flow key in a Core Activity Manager (or "CAM"), which would indicate that a PPC was actively processing an event related to that flow. If a match is not found in the CAM (which may be physically or conceptually separate from the dispatcher), then in this exemplary embodiment it is presumed that no PPC is actively processing an event of the flow, and at a step 506 a CAM entry will be initialized to track the activity of the PPC assigned to process the event.

At a step 508, the dispatcher searches for a local flow ID proxy that corresponds to the flow key. For SPPSs that handle a large number of flows, this search may be performed by a distinct lookup module which may, for example, perform a hash lookup to locate a local flow ID proxy as quickly as possible. A decision step 510 depends on whether a local flow ID proxy matching the flow key was found. If not, then the SPPS may not yet be processing any data from the flow, and accordingly at a step 512 a flowstate ID may be selected to be associated with the flow that is uniquely identified by the flow key of the event. Thereafter (or if a local flow ID proxy was found and the decision at the step 510 was "yes"), processing may proceed at a step 514.

A PPC is selected to handle the event at the step 514. This step may include a substep of determining the type of event being processed, though in some embodiments this substep is performed by earlier processing modules (e.g., a message splitter such as 206 or 208 of FIG. 2). An "event-type mask" maintained in the dispatcher for each PPC may be compared to bits indicating the type of event to determine which PPCs are compatible with the event type. Another substep may include examining the relative activity levels of those PPCs that are configured to handle the event type. The least busy PPC may be selected, or the next PPC that has any room in its input queue may be selected in a round-robin fashion. As a further example, data may be maintained on recent PPC activity (e.g., in a core activity manager submodule) including assignment of local workspaces, and a PPC may be selected that has not yet overwritten its flowstate memory for the flow of the event, even though it is otherwise considered "done" with the flow. A director submodule, either in combination with or as part of a core activity manager (CAM) submodule, may perform these acts. Selection of a PPC (within the universe of compatible PPCs) is generally made for the flow of each incoming event specifically, without regard to an a priori class of flows to which the flow might belong (such as by virtue of characteristics of its flow key). As a result of such individual assignment techniques, the PPC selected to handle a particular event of a flow frequently differs from a PPC that handled previous events of the same flow (unless the particular flow is presently active in a PPC, as explained elsewhere).

Since the flowstate was initialized in the step 512, or was located in the steps 508-510, and the PPC was selected at the step 514, the flowstate may now be transferred to the PPC at a step 516. In some embodiments such transfer may be "virtual," merely providing an indication of where the flowstate exists in memory so that the PPC can access it. Next, processing can proceed to a step 518. This same step may be reached directly from the decision step 504, since if that decision was "yes" then a PPC is already processing an earlier event belonging to the same flow. Such an active PPC will (in many embodiments) already have the most valid flowstate for the flow, and in that case will generally be selected to process the present event. Therefore, at the step 518, the event itself may be forwarded to an input area or queue of the selected PPC. Along with the step 518, an event counter may be incremented at a step 520. The event counter is one way to determine when a PPC is actively processing another event of the flow of the present event, but other ways may be used, such as waiting for the PPC to indicate that it is done processing all present events of a particular flow. This is the end of the receive processing for the dispatcher.

Figure 6:
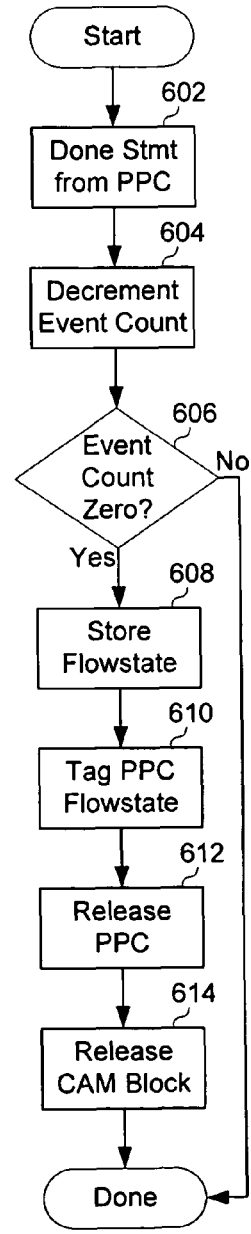
FIG. 6 is a flowchart illustrating certain acts that the dispatcher module (or its submodules) may perform in response to feedback from a protocol processing core.

FIG. 6 is a flowchart illustrating some steps that the dispatcher (or its submodules) may perform in response to feedback from the PPC. As in FIG. 5, the steps of FIG. 6 are largely a subset of steps taken by the overall SPPS, but they are described from the perspective of the dispatcher, and may contain more or different steps than are illustrated in FIG. 4 for the overall SPPS.

The illustrated response acts of FIG. 6 start at a step 602 during which the dispatcher receives a "done statement" or other indication that a PPC has completed processing an event of a particular flow. The dispatcher may then decrement the event counter for the flow (discussed with respect to the step 520 of FIG. 5). If, at a decision step 606, the event counter is found to have reached zero, or if the completion of a "burst" of events by a PPC is otherwise indicated, then the dispatcher may cause the flowstate, as updated by the PPC, to be stored in more permanent memory to free up the memory of the PPC. (Note that this step is not needed for embodiments in which the same memory is used by the PPC during processing as when no PPC is processing the memory, a circumstance that may occur, for example, when the flowstate is always maintained in the same global location, and is merely accessed by a PPC processing the flow, as needed). A flag or other indication may then be included in the CAM, or sent to the PPC, to indicate that the flowstate stored in the PPC is no longer valid. Then at a step 612, the PPC may be released from handling the particular flow it was processing. Since no active PPC is now processing an event of a particular flow, the CAM block in which the PPC activity was maintained can also be released at a step 614.

Note that "release" may amount to merely setting a flag showing that the PPC (or the CAM memory block) is available. Such flag may indicate availability, but a PPC may be treated for all intents and purposes as if it is still actively processing events of a flow after such indication, as long as no essential data has been overwritten. In that case, the decision step 606 would return a "no" until the data blocks are actually overwritten and thus destroyed. In any case, if the decision step 606 returns a "no," then processing is done, since the steps 608-614 are generally not needed in that event. Otherwise, processing is done after the CAM block is released at the step 614.

Encapsulated Stateful Flow Processing

One manner in which a SPPS (stateful protocol processing system) such as described herein may process flows of layers other than transport layers is by extracting the encapsulated messages and recirculating the extracted messages for further processing. Such further processing may be performed in accordance with the appropriate protocol for the encapsulated message, which is typically different from the protocol (typically a TLP) used for the encapsulating messages.

After an encapsulated stateful message is retrieved, reformatted and provided to a SPPS as an input (a non-transport layer input), the SPPS can process the message in accordance with the appropriate protocol as long as one or more of the PPCs are configured with the steps required by the particular protocol (e.g., iSCSI). Thus, it is straightforward to simply use a SPPS for non-transport layer processing.

There are numerous ways in which a SPPS may be notified that encapsulated data requires recirculation. Notification may be implicit, for example, if all processed data requires recirculation. Alternatively, one or more portions of the header or payload of the encapsulating messages may contain information indicating a need for such recirculation. A SPPS may examine each payload for an indication to recirculate encapsulated information, or it may examine payloads only when an indication is provided in the header. Thus, the SPPS may receive instruction as to whether a payload is to be examined, whether it requires further processing, and by what protocol such further processing should be performed, by any combination of implicit and explicit information in the header and/or payload of the encapsulating message.

A "recirculation" protocol may first be invoked such that the payload (and/or portions of the header) of an encapsulating message is segmented and reassembled as a message for the encapsulated flow. Note that a single encapsulating message may contain all or part of a plurality of encapsulated messages, and that conversely a single encapsulated message may require a plurality of encapsulating messages to be conveyed (for example, when a large message is encapsulated in a plurality of small packets, such as ATM packets). The recirculation protocol defines appropriate reassembly of the encapsulated message, and also directs that it be returned to the input of the SPPS for further processing. Such a recirculation protocol may format the recirculated message in a particularly efficient format, such as by specifying the local flow ID proxy, the event type, and other useful information as is known. In this manner the SPPS recirculation protocol processor(s) would function similarly to a host operating in close conjunction with the SPPS. Such a host, having knowledge of an ideal format for messages to the SPPS, may speed processing by formatting messages in such ideal format.

It should also be noted that recirculation may be effected by a modified communication path, such that the reassembly or "output processors" 242 and/or 244 transfer the reassembled encapsulated message directly back to a message splitter 206 or 208, rather than passing it through interfaces such as the SPI-4 interfaces in 242, 244, 202 and 204 which may be unnecessary for recirculation. Indeed, the recirculated message may be entirely preformatted in the manner that would otherwise be effected by the message splitters 206 or 208. The selected PPC processing the encapsulating message (or a related processor) may perform such preformatting and direct the information to be delivered directly from the reassembly processors in 242/244 to the scratchpad memory 210 and the dispatcher 212, thus bypassing the message splitters entirely.

Once recirculation has been effected, further processing of the encapsulated information may proceed just as described hereinabove, that is, in substantially the same manner that a TLP message is processed. In the case of interest, the encapsulated information is stateful and belongs to a flow, so an event may be created that reflects the state-relevant portion of the message, a local proxy of the flow key will be determined, a state for the flow will be created or located, and a PPC (protocol processing core) compatible with the protocol will be assigned to process the event derived from the (previously encapsulated, now recirculated) message. These steps may be performed not only for recirculated messages, but for messages of any flow, whether transport layer or not, that is provided to an input of the SPPS.

Processing a non-transport layer message may, of course, require that information be sent to a further subsystem. For example, data within an encapsulated message may require delivery to a host. The assigned PPC may effect such sending by directing that the information be reassembled in a manner acceptable to the target host, and then directing that the reassembled message be transferred to the target host. In an alternative, sending the encapsulated message to a network connection may require that the outgoing message be reencapsulated in a TLP message (typically, but not necessarily, the same TLP, such as TCP, that was used for the original encapsulating message). Thus, further recirculation may be required at this point to reencapsulate such message. In theory, at least, messages may be "nested" in a series of any number of encapsulations that must be stripped off before the innermost stateful message can be processed. Similarly, processing such innermost stateful message may require symmetrical reencapsulation of a message. In practice, excessive encapsulation will be avoided in the interests of efficiency.

Timer Management within a Stateful Protocol Processing System (SPPS)

Overview of Exemplary SPPS

Figure 7:
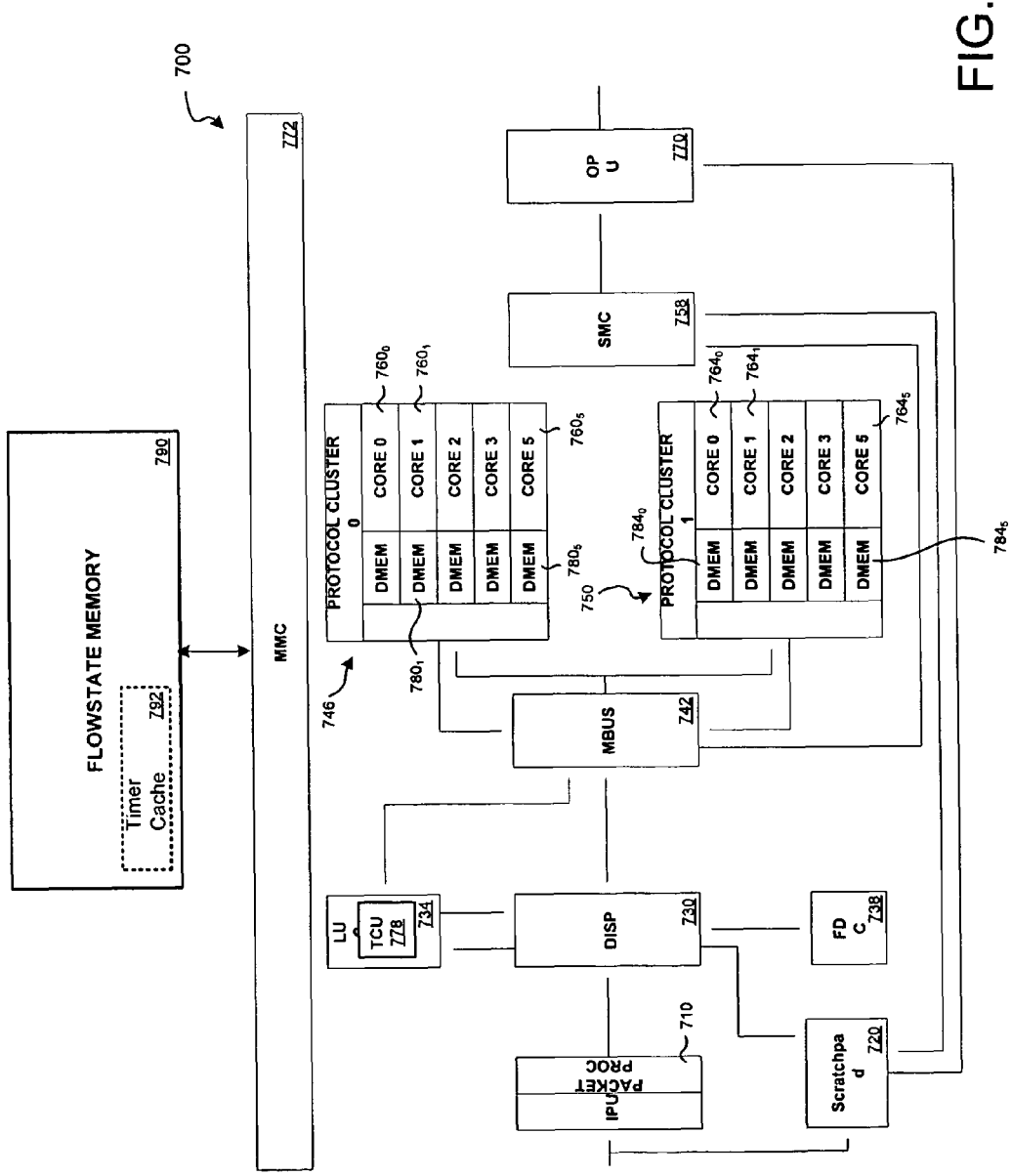
FIG. 7 is a block diagram of a particular implementation of a stateful protocol processing system (SPPS) to which reference will be made in describing the manner in which the present invention facilitates management of protocol timers operating therein.

FIG. 7 is a block diagram of a particular implementation of a stateful protocol processing system (SPPS) 700 to which reference will be made in describing the manner in which the present invention facilitates management of protocol timers operating therein. Referring to FIG. 7, received packets are initially processed by an input processing unit (IPU) 706 and a packet processor (PP) 710 encapsulated therein. These elements are in communication with scratchpad memory 720 as well as with a dispatcher 730. As shown, the dispatcher 730 interacts with both a look-up controller submodule (LUC) 734 and a flow director CAM (FDC) 738. A message bus 742 communicatively links the dispatcher with a first protocol cluster 746 and a second protocol cluster 750. In addition, the message bus 742 provides a link to a socket memory controller (SMC) 758, which is also in operative communication with an output processing unit 770.

During operation of the SPPS 700, the PP 710 is one of the initial processing elements encountered by a message received from an external network or host. The PP 710 is configured to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified.

Received messages are examined by the PP 710 in order to determine a "type" for the event derived from the message. Each different protocol that is processed by the SPPS 700 may thus have a particular "type," and this information may be included in the event to simplify decisions about subsequent processing. Since the "type" of the event may be useful to direct the subsequent processing of the event, messages having errors that should be handled differently may be identified as a subtype of a general error. Upon generating an event of a type corresponding to a received packet, the PP 710 performs certain stateless processing consistent with the applicable event type (e.g., verifies certain fields in a packet header have legal values) and extracts an event-type-specific "flow key".

The flow identification key (or simply "flow key") uniquely identifies the flow to which the message belongs in accordance with the TLP used by the flow. The flow key can be large (typically 116-bits for TCP) and as such it may not be in a format that is convenient for locating information maintained by the SPPS 700 that relates to the particular flow. A local flow ID proxy may be used instead for this purpose. A local flow ID proxy (or simply "local proxy ID," "local flow ID," "proxy ID," or "socket ID") generally includes enough information to uniquely identify the particular flow within the SPPS 700, and may be made more useful for locating information within the SPPS that relates to the particular flow. For example, a local flow ID proxy may be selected to serve as an index into a flowstate memory (not shown) to locate information about a particular flow (such as a flowstate) that is maintained within the SPPS 700. Not only may a local flow ID proxy be a more convenient representative of the flow for purposes of the SPPS 700, it will typically be smaller as well.

A flow key comprises a unique identifier of a state object used in later "stateful" processing of an event; that is, the flow key is used to retrieve an associated state object, take some prescribed action based upon the event type and current state, generate output events, update the state object, and wait for arrival of a new packet to precipitate generation of another event. In the exemplary embodiment extraction of the flow key from an event is accomplished by the PP 710, which sends the extracted flow key to the dispatcher 730.

As shown in FIG. 7, an event derived by the IPU 706 is forwarded to the dispatcher 730, where it may be entered into a queue. In turn, the dispatcher 730 identifies which of the processor cores 760, 764 within the protocol clusters 746, 750 are capable of processing the event. The dispatcher 730, in cooperation with the LUC 734, also coordinates the lookup of the corresponding flow state or "workspace" using the flow key associated with the event. Each processor core 760, 764 is also provided with local memory 784, 788 sufficient to hold the relevant flow state data of a flow currently being processed by such processor core 784, 788. The dispatcher 730 also cooperates closely with the FDC 738 in tracking which flows are currently being processed by the SPPS 710. In the exemplary embodiment the dispatcher 710 uses the type number associated with the event to index a table (not shown) containing information as to which processor cores 760, 764 are capable of processing the applicable event type.

Overview of Timer Management in Stateful Protocol Systems

When configured to implement various stateful protocols, the SPPS 700 is often required to establish a number of timers with respect to each flow or connection processed in accordance with one of such protocols. For example, typical implementations of the TCP protocol involve use of seven different protocol timers, only five of which will ever be required to be used concurrently. Accordingly, in these implementations a set of five timers need to be established for each flow. When the SPPS 700 is employed in applications requiring the processing of a large number of flows (e.g., up to 4 million), it is clear that the tracking of multiple protocol timers per flow may become computationally intensive. As is described hereinafter, the present invention provides a unique and efficient method for tracking and otherwise managing a large number of such protocol timers.

As is known, general purpose processors configured to execute stateful protocols have conventionally also implemented data structures and algorithms for maintaining timers associated with such protocols. When the processor determines a timer has expired, it must fetch the state associated with that flow and determine the correct action. Unfortunately, this approach tends to be rather slow and computationally inefficient.

In contrast, the SPPS 700 is configured to track a programmable number of timers in an external engine (i.e., the Timer Control Unit (TCU) 778 disposed within the LUC 734). This substantially reduces or eliminates the "waste" of processor cycles during the time period in which data structures are accessed and algorithms executed in order to effect conventional timer tracking. In addition, when the TCU 778 of the LUC 734 determines that a timer has expired, it automatically does a lookup of the state information for the associated flow within flowstate memory 790. This state information and an expired timer event are then presented to a processor core 760, 764 by way of the standard selection processes performed by the dispatcher 730 (i.e. timer events are load-balanced just like any other event). This renders it unnecessary for the given processor core 760, 764 to devote processing cycles to the task of looking up or retrieving flow state information from flowstate memory 790. Rather, such state information is provided to the processor core 760, 764 in a single memory cycle. As is described hereinafter, the SPPS 700 facilitates this bifurcation of processor cores 760, 764 and timer elements by providing a mechanism to maintain coherency among the processor cores 760, 764.

In accordance with one aspect of the invention, a timer cache 792 is provided in order to allow maintenance and appropriate decrementing of timers associated with flows that have been "checked out" from flowstate memory 790 to the local memory 780, 784 of a processor core 760, 764. As mentioned above, the processor core 760, 764 may modify the state of the flow that has been so checked out as a consequence of its execution of a state machine embodying the protocol applicable to such flow. During this time period the LUC 734 will generally be prevented from issuing timer events with respect to such flow in order to ensure that the associated timers are not incorrectly decremented during the pendency of the check out period. However, since it is nonetheless desired that all timers associated with checked-out flows be appropriately adjusted during the applicable checkout periods, such timers are maintained in the timer 792 cache in the manner described hereinafter.

Role of LUC in Timer Management
Overview

During the operation of protocols such as TCP, it is often necessary to retrieve the state of a particular connection. For TCP this state is keyed by the {IP Destination Address, IP Source Address, TCP Destination Port, TCP Source Port, Source ID Number} tuple. The amount, and content, of this state varies widely between protocols. For example, a flow state for TCP would be 512 bytes long and would contain information such as: connection state (established, closing, closed etc.); window sizes; timer information; route information; and pointers to data buffers for receive and transmit.

Similarly, once the TCP protocol has been processed there may be some form of application processing required. This application processing also requires state information. The amount of application state required obviously depends on the application being supported.

The purpose of the LUC 734 is to store this protocol and application state information in a format that allows for quick lookups and updates. The LUC 734 calls this information "flowstate" or "flow state", and it accesses it via a flow key. For TCP this flow key consists of the {IP Destination Address, IP Source Address, TCP Destination Port, TCP Source Port, IP Protocol, Source ID Number} tuple, but for other protocols other fields will be used. The Source ID Number is included in the flow key for when it is desired to distinguish flows received on different interfaces. For traditional TCP termination this Source ID Number is set to zero by the PP 710, and is used primarily for transparent TCP termination.

Another task of the LUC 734 is to maintain a programmable number of timers on a per flow basis. Protocols and applications often require such timers a number of purposes (e.g. frame re-transmission, delaying packets etc.). With large numbers of flows maintaining these timers can be a large overhead for a general purpose CPU, therefore requiring that the LUC 734 take control of this task.

Exemplary Implementation of TCP Timers

In the exemplary embodiment, a number of timers are associated with each flow entry in the LUC 734. These timers are used to facilitate correct execution of the applicable protocol (e.g. control timing of re-transmission timeouts, etc.), as well as the execution of higher-level applications involving a given flow. Since maintaining all of the timing associated with a very large number of flows (e.g., 4 million) tends to be computationally burdensome, the LUC 734 prevents the overhead associated with timer maintenance from degrading the performance of the SPPS 700.

In this section an example is provided of the manner in which the LUC 734 may be configured to maintain a set of timers used in implementation of the TCP protocol. Although the following discussion is specifically directed to TCP timers, those skilled in the art will appreciate that the LUC 734 could be configured in a similar manner to implement timers consistent with other protocols.

In accordance with TCP, a set of seven timers are maintained for each connection: Connection Establishment, Retransmission, Delayed ACK, Persist, Keepalive, FIN_WAIT_2 and 2MSL timers. This set of timers may be described as follows:

Connection Establishment Timer. This timer begins when a SYN is sent by a first device. If no response is received from a second "remote" device within 75 seconds, then the connection is aborted.

Retransmission Timer: This timer is used to re-send data from the first device that is not acknowledged by the remote device. This timeout varies during the lifetime of a connection dependent upon the round trip time (RTT), but TCP limits its range from 1 to 64 seconds.

Delayed ACK Timer. When TCP receives data and wants to send an ACK, it sets the Delayed ACK Timer. This might allow it to acknowledge multiple receives frames, and is generally of a resolution of 200 ms.

Persist Timer: This timer is set when the remote device advertises a window of zero. This allows the local TCP to probe the window in the event window advertisements become lost. As with the retransmission timer, this timer varies during the lifetime of a connection dependent upon the RTT, but TCP limits its range from 5 to 60 seconds.

Keepalive Timer. This timer enables verification that a connection is still active. Every two hours a special segment is sent by the first device to the remote device. If the remote device responds correctly, then nothing is done and the Keepalive Timer is restarted; otherwise the connection is reset.

FIN_WAIT_2 Timer. When an application closes a connection, the first device enters a FIN_WAIT_1 state and a FIN is sent. When that FIN is acknowledged, the FIN_WAIT_2 state is entered during which the first device effectively waits for the remote device to send a FIN. It could be possible that this FIN gets dropped, or the remote device does not send it, so the FIN_WAIT_2 Timer is utilized and is set to a duration of 10 minutes. After the FIN_WAIT_2 Timer has expired, the application checks the connection every 75 seconds, and closes it if the connection is idle.

2MSL Timer. This timer derives its name from the fact its period is twice the maximum segment lifetime. When an application executing on the first device closes a connection, it enters the FIN_WAIT_1 state and a FIN is sent from the first device. When that FIN is acknowledged, the remote device also sends a FIN and the first device enters the TIME_WAIT state. This timer is set when the TIME_WAIT state is entered, and has a period of 1 minute.

In a traditional TCP/IP stack based upon the BSD operating system, each of the above timers are ticked every 500 ms (except for the Delayed ACK Timer, which has a resolution of 200 ms). It is observed that the Delayed ACK Timer is a single shot timer, and setting it results in its being timed out in the next 200 ms tick.

Two pairs of the timers are configured to be mutually exclusive; that is, only one timer of the pair may exist at any given time. The first timer pair is comprised of the Connection Establishment Timer and the Keepalive Timer. The Connection Establishment Timer is only active during the period the connection is being established, while the Keepalive Timer is only active after the connection has been established. Similarly, the FIN_WAIT_2 Timer and 2MSL Timer form a mutually exclusive pair in which each timer is tied to a specific state. Since only one state may be active at any given time, the timers are mutually exclusive. If the Delayed ACK Timer is considered as a special case one-shot timer, then the remaining six timers may be implemented with only four physical timers (i.e., each pair of mutually exclusive timers may be realized using a single physical timer).

In addition to supporting protocol timers, the LUC 734 will generally also be configured to support certain application-specific timers for use by the interface cores, host CPU or upper-layer protocols. Referring now to Table I, there is shown an exemplary set of timers supported by the LUC 734 for TCP when the LUC 734 is configured for a fast timer resolution of 200 ms. Table I also identifies the range and resolution of these timers on a device configured with a BSD operating system. In a BSD environment, these timers are typically limited to the size of the applicable 16 or 32-bit word. However, in order to conserve memory the LUC 734 may not be configured to accommodate the full extent of the ranges commonly associated with entirely software-based timer implementations. Nonetheless, the range of timers disposed within the LUC 734 may be expanded by maintaining a separate timer expired count in a particular workspace. This is effected by simply counting multiple LUC timer expirations rather than employing a timer of larger dynamic range. In this way the dynamic range of the timers disposed in the LUC 734 may be expanded at the expense of slightly increased workload for the processor cores 760, 764.

TABLE I

| Timer | | BSD | | | LUC Timer Control Unit | | |
|---|---|---|---|---|---|---|---|
| Number | Name | Min. | Max. | Resolution | Min. | Max. | Resolution |
| Protocol Timer 1 | Delayed ACK | Default is 200 ms. Can be configured. | | 200 ms | 200 ms | 1 s | 200 ms |
| Protocol Timer 2 | Retransmission Timer | 1 s | 64 s | 500 ms | 200 ms | 101.8 s | 200 ms |
| Protocol Timer 3 | Connection Establishment Timer | Default is 75 s. Can be configured. | | 500 ms | 2 s | 2.2 hours | 2 s |

TABLE I-continued

| Timer Number | Name | BSD Min. | BSD Max. | BSD Resolution | LUC Timer Control Unit Min. | LUC Timer Control Unit Max. | LUC Timer Control Unit Resolution |
|---|---|---|---|---|---|---|---|
| | Keepalive Timer | Default is 2 hours. Can be configured. | | | | | |
| Protocol Timer 4 | FIN_WAIT_2 Timer | Default is 10 m + 75 s. Can be configured | | 500 ms | 2 s | 16.9 m | 2 s |
| | 2MSL Timer | Default is 1 m. Can be configured. | | | | | |
| Protocol Timer 5 | Persist Timer | 5 s | 60 s | 500 ms | 200 ms | 101.8 s | 200 ms |
| Application Timer 1 | Fast Application Timer | N/A | N/A | N/A | 200 ms | 50.6 s | 200 ms |
| Application Timer 2 | Medium Application Timer | N/A | N/A | N/A | 2 s | 122 s | 2 s |
| Application Timer 3 | Long Application Timer | N/A | N/A | N/A | 2 s | 8.4 m | 2 s |

Referring to Table I, the timers of a TCP/IP stack operating within a BSD environment are configured with a resolution of 500 ms resolution, except for the resolution of 200 ms accorded the Delayed ACK Timer. However, within the LUC 734 configured for TCP, a resolution of 2 seconds is employed for all timers except for the Delayed ACK, Retransmission and Persist timers, for which a resolution of 200 ms is used. This is because it is anticipated that a resolution of 2 seconds should be sufficient for the majority of the timers maintained by the LUC 734, which tend to be 75 seconds to approximately 2 hours in length. In the exemplary embodiment the LUC 734 maintains timing-related information such as that described above within a timer table comprised of a set of timer entries. It is observed that the LUC 734 may be configured for faster timer resolutions in other embodiments.

Figure 8:
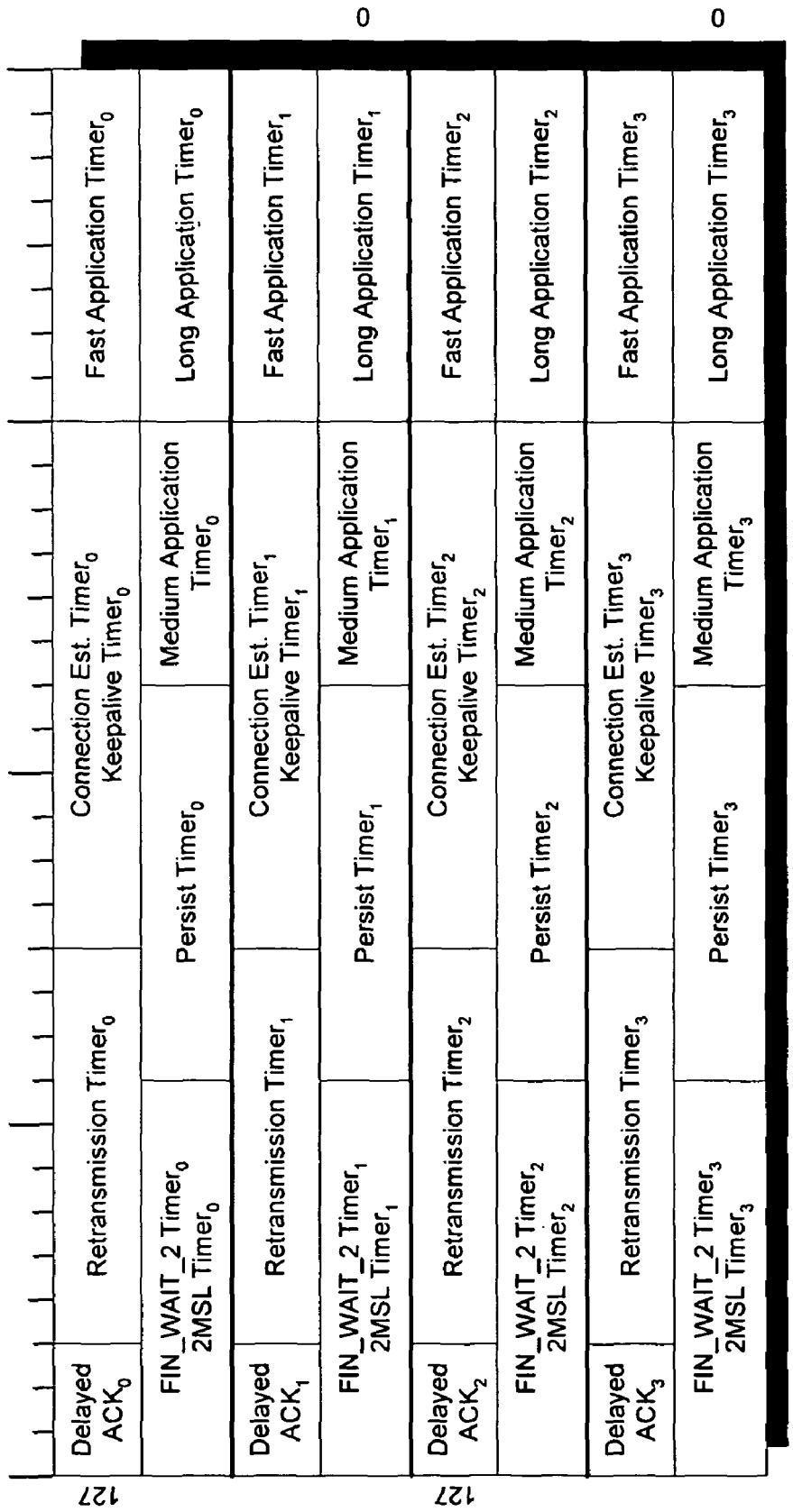
FIG. 8 illustrates the format of an exemplary entry within a timer table maintained by a lookup controller of the SPPS of FIG. 7.

FIG. 8 illustrates the format of an exemplary entry within the timer table maintained within the LUC 734. In one embodiment each entry within the timer table is 32-bytes, which allows the recording of timers associated with four flows. In order to retrieve the timers associated with a given flow, the value of a Local Proxy ID[21:2] is used as an index into the timer table to obtain the 32-byte timer entry. The value of Local Proxy ID[1:0] is then used to select the appropriate set of timers.

Table II defines the set of values which may be assumed by the timers depicted in FIG. 8. As is indicated by Table II, an expired timer may assume one of two values: (i) all ones, and (ii) all ones minus one. The LUC 734 checks for both of these values. Failure of the processor cores 760, 764 to process any timers registering all ones will result in timers becoming a block for the applicable flow, since the TCU 778 of the LUC 734 will be under the impression that the timer has already been issued. The LUC 734 may process any timers that have value all ones minus one. Any of those timers that are not processed will cause a timer expiration when the applicable flow is checked in to flowstate memory 790 from the local memory 780, 784 of a processor core 760, 764.

TABLE II

| Timer Value | Description |
|---|---|
| 0 | The timer is disabled and will not be ticked. |
| All ones | The timer has expired, and a CRTIMER command was successfully issued to the FDC. |
| All ones minus 1 | The timer has expired, but the CRTIMER FDC command was either not successful or has not yet been issued. |
| Other values | These indicate the actual amount of time left for the applicable timer. For example, if a 200 ms timer has value 2 then it will expire in the next 200 to 400 ms (assuming the resolution of the TCU has been programmed to 200 ms). |

LUC Interaction with Other Elements of SPPS

As was described in the preceding sections, a number of timers are associated with each flow entry in the LUC 734. When the LUC 734 has determined that a timer has expired, it creates a timer entry in the FDC 738 and passes a "timer expired" event to the dispatcher 730. The dispatcher 730 eventually services this timer expiration and requests a flow lookup. A pair of processor cores 760, 764 are then notified of the timer expiration, and the flow's state is used to determine the correct action and next state. It is observed that the LUC 734 will generally not be configured to automatically send the flow state to the processor cores 760, 764. Rather, for the reasons described hereinafter the LUC 734 waits until the FDC 738 indicates that it can do so.

During the processing of a packet event, the applicable processor core 760, 764 may decide to reset a timer associated with a particular flow state by setting a reset bit for such timer. This causes the LUC 734 to correctly adjust the value of such timer upon copying of the flow state from the applicable local core memory 780, 784 back to flowstate memory 790. However, a time gap exists between when a processor core 760, 764 decides to cancel a timer, and when the LUC 734 actually cancels the timer. In this regard consider the exemplary case in which a processor core 760, 764 is processing a packet event and decides to cancel the Retransmission Timer. However, at the same instant the LUC 734 expires the Retransmission Timer and issues a timer expiration event to the same processor core 760, 764. But this is inappropriate, since the timer should have been cancelled. The processor core 760, 764 will now receive a re-transmission timeout, which violates the TCP protocol.

To prevent this situation from arising, the LUC 734 may be configured to operate as follows:
  (i) The LUC 734 is not permitted to issue timer events for flows that are checked out from flowstate memory 790. From the perspective of the LUC 734, a flow is checked out from the time it receives a lookup request for the flow until the time the time it receives an update/teardown for the flow. However, due to queues between the LUC 734 and the dispatcher 730, this operational characteristic may not entirely address the difficulties described above.

(ii) Accordingly, the LUC 734 also creates a timer command to the FDC 738 before a timer expired message can be sent to the dispatcher 730. If the FDC 738 has an entry for the flow, then the create timer command will be denied and the LUC 734 will again try to create the command after a predefined waiting period.

Timer Cache

As described above, the LUC 734 maintains a number of timers per flow. When a flow is checked out, the LUC 734 precludes the issuing of any timer events for such flow. However, during this check-out period the timers for the flow still need to be appropriately decremented (timer expired events are just not issued).

In order to improve performance, a timer cache 792 of predetermined size (e.g., 64-bytes) is maintained in external flowstate memory 790. Each entry or "cache line" of the timer cache 792 contains a plurality of values representing the state of the timers for a given flow. In the case where each flow requires 8 bytes of timer-related information, the timer cache 792 maintains timer information for 8 flows. When a flow is checked out, the portion of flowstate memory 790 containing the timers for that flow is entered into the timer cache 792. While a given flow is checked out, the values of the applicable cache line of the timer cache 792 are updated rather than the corresponding portions of flowstate memory 790. In the exemplary implementation the timer cache 792 comprises a CAM that is looked up using a shifted value of the Local Proxy ID. Note also that when a timer tick occurs the LUC 734 first checks the contents of the timer cache 792 before retrieving an entry in the timer table. Tables III and IV illustrate the format of an entry in the timer cache 792 of the LUC 734.

TABLE III

| Field | Size | Description |
| --- | --- | --- |
| Valid Bit | 1-bit | Indicates if the entry in the timer cache is valid. |
| Lock Bit | 1-bit | Indicates if this entry is currently being worked on and is locked. |
| Timer Cache Key | 19-bits | This is the key for the timer cache. It is Local Proxy ID[21:3]. Since each timer cache entry contains eight flows worth of timers, we shift the local proxy ID right by 3 to form the tag. |
| Checkout Bitmap | 8-bits | Each bit indicates whether the timers for this flow are checked out or not. When this bitmap reaches zero the cache line can be written back to DDR memory and emptied. |
| Timers for Local Proxy ID[2:0] | 8 × 64-bits | Timers for each flow. A flows worth of timers is 64-bits. |

TABLE IV

| Field | Size | Description |
| --- | --- | --- |
| Valid Bit | 1-bit | Indicates if the entry in the timer cache is valid. |
| Lock Bit | 1-bit | Indicates if this entry is currently being worked on and is locked. |
| Timer Cache Key | 20-bits | This is the key for the timer cache. It is Local Proxy ID[21:2]. Since each timer cache entry contains four flows worth of timers, we shift the local proxy ID right by 2 to form the tag. |
| Checkout Bitmap | 4-bits | Each bit indicates whether the timers for this flow are checked out or not. When this bitmap reaches zero the cache line can be written back to DDR memory and emptied. |
| Timers for Local Proxy ID[1:0] | 4 × 64-bits | Timers for each flow. A flows worth of timers is 64-bits. |

The timer cache 792 is configured to be responsive to at least the following commands:

Lock Unconditional: Given a local proxy ID, this command is implemented by looking up and locking a line in the cache 792. If a timer cache entry is found, but the lock bit is set, then this command is not acknowledged. If a timer cache entry does not exist then one is created and locked. The response of this command indicates if a timer cache entry had to be created or not.

Unlock: This command clears the lock bit.

Unlock and Remove: This command clears the valid bit.

Using the above commands, the LUC 734 manages the timer cache 792. For example, when performing a command such as Lookup with Flow Key (LFK), the LUC 734 will use a Lock Unconditional command on the Local Proxy ID. It will then update a checkout bitmap to indicate that the associated flow is now checked out. It is observed that once a cache line of the timer cache 792 has been locked, the checkout bitmap and timers can be modified. Finally an Unlock command leaves the cache line intact but clears the lock bit. Any future operations performed upon the timers of the flow are then performed upon the timer values in the applicable cache line of the timer cache 792.

The use of a lock bit is intended to prevent multiple functional units from simultaneously processing a given cache line. For example, it is desired to ensure that collisions do not occur between the TCU 778 and any other elements of the LUC 734 during updating by the TCU 778 of the timers associated with a cache line of the timer cache 792.

The timer cache 792 should be sufficiently large to allow for a desired maximum number of flows to checked out at any one time. For example, in an exemplary implementation in which the FDC 738 contains 96 entries, up to 96 flows could be checked out at any given time. In this implementation the timer cache would contain 97 cache lines or "entries" (i.e., 96 entries to accommodate the maximum number of flows, plus one more entry for use by the TCU 778 of the LUC 734).

Figure 9:
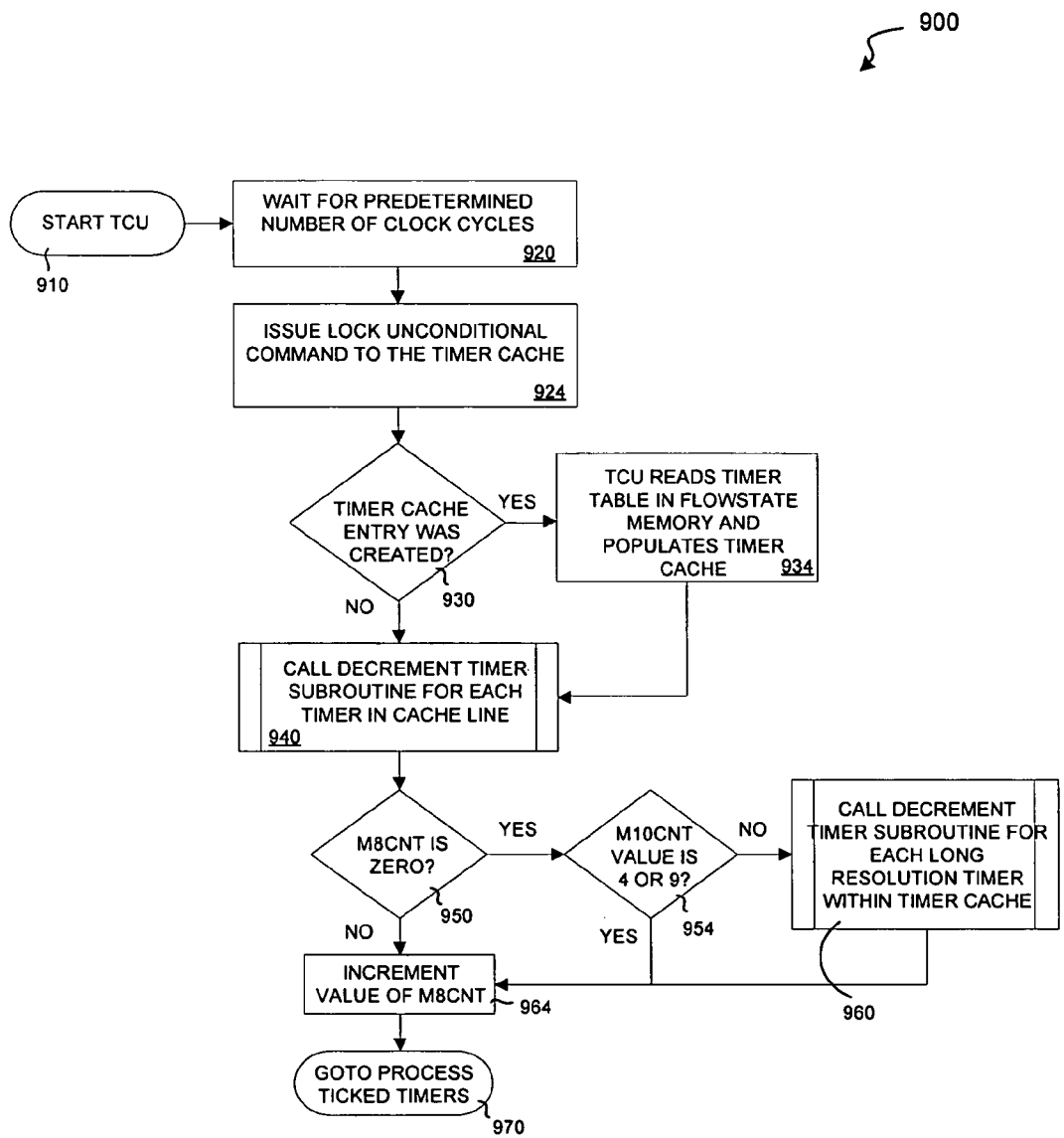
FIG. 9 is a flowchart illustratively represents operation of a timer control unit of the lookup controller module.

Referring now to FIG. 9, a flowchart 900 is provided which illustratively represents operation of the TCU 778 within the LUC 734. Upon initiating operation of the routine executed by the TCU 778 (step 910), the routine waits for a predetermined number of clock cycles indicated by an INTERVAL value within a control register of the TCU 778 (TCU_CTRL register) (step 920). Once that period of time has expired, the TCU 778 issues a Lock Unconditional request to the timer cache 792 identifying a particular cache line (step 924). The TCU 778 then has complete access to the specified timer cache line once it is subsequently granted a Lock. If a cache line was created in the timer cache 792 in response to this request (step 930), then the TCU 778 sets the timer values within the cache using information from the timer table maintained in general flowstate memory 790 (step 934).

The value of each timer within the specified cache line is then decremented by a programmable interval (e.g., 200 ms) by calling a Decrement Timers subroutine (step 940). The Decrement Timers subroutine does not trigger any events, it simply decrements the timer values within the specified cache line.

Next, it is determined whether it is necessary to decrement any long resolution (e.g. 2 s) timers within the timer cache 792. This may be done using a modulo ten counter (M10CNT) in combination with a modulo eight counter (M8CNT). If the value of the M8CNT variable is zero (step 950) and the value of M10CNT is not 4 or 9 (step 954), then any such long resolution timers are decremented via the Decrement Timers subroutine (step 960). Finally, the value of the modulo eight counter M8CNT is incremented (step 964), and processing continues in accordance with a Process Ticked Timers routine (step 970).

LUC Interaction with FDC Upon Time Expiration

Figure 10:
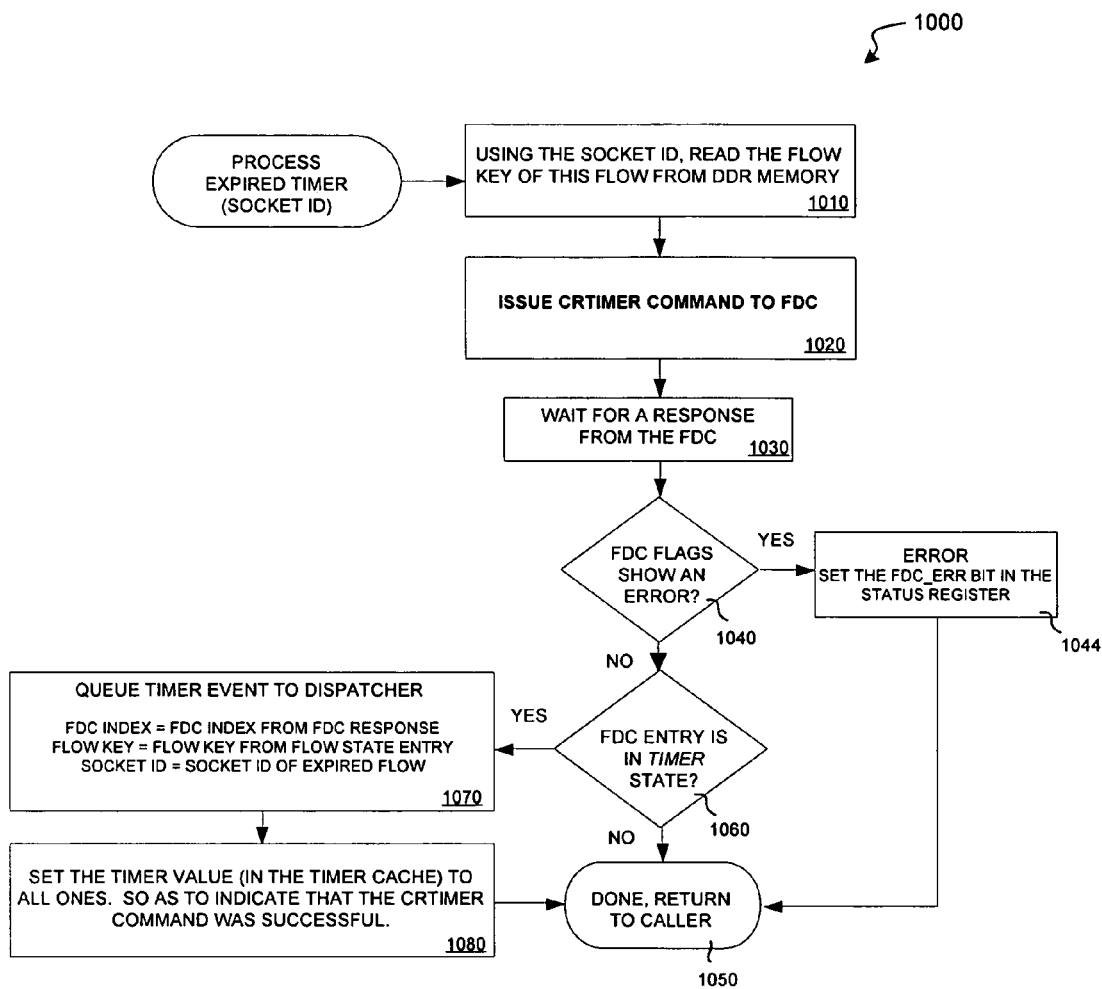
FIG. 10 is a flowchart of a Process Expired Timer routine employed when a timer of a flow that has not successfully been reported has expired.

Turning now to FIG. 10, a flowchart is provided of a Process Expired Timer routine 1000 employed when a timer of a flow that has not successfully been reported has expired. The purpose of the Process Expired Timer routine is to ensure that a correct command regarding timer expiration is issued to the FDC 738 and to update the corresponding timer value accordingly.

The routine 1000 commences by identifying the relevant flow key (step 1010) so that the CRTIMER command may be issued to the FDC 738 (step 1020). Note that since the exact flow that is being processed in the timer cache 792 is known, then by virtue of the value of the CurrentTmrIdx it is possible to identify the Socket ID (Local Proxy ID) of the expired timer. Using this Socket ID value, the LUC 734 reads (from flowstate memory 790) a predetermined number of bytes of the flow state containing the flow key for the applicable flow.

A CRTIMER command is then issued to the FDC 738, and the TCU 778 of the LUC 734 waits for the response (step 1030). If the response of the FDC 738 indicates an error condition (step 1040), a bit in the STATUS register is set (step 1044) and processing returns to the caller (step 1050). If the response of the FDC 738 indicates that this FDC entry is now in the TIMER state, then the CRTIMER command was successful (step 1060). If the FDC 738 indicates any other response, then the CRTIMER command was not successful and is attempted again at a later time. The CRTIMER command may not be successful due to a variety of reasons, e.g. the FDC 738 may be full, or the FDC entry may be in a state that does not allow timer expirations to be issued.

If the CRTIMER command was successful, then a timer event is issued by the LUC 734 to the dispatcher 730 using information from the response provided by the FDC 738 (step 1070). Note that the timer event issued to the dispatcher 730 should include information identifying both the Flow Key and the Socket ID. The timer value is then set to all ones in order to indicate that the timer has had a successful CRTIMER response, as well as to prevent any future timers for the associated flow from issuing another CRTIMER command (step 1080).

If the CRTIMER command was not successful, then the timer value is left at all ones minus one. This will have the effect of causing the TCU 778 to attempt to determine the status of the applicable timer expiration upon again beginning to process the associated flow, which in the exemplary embodiment will occur during the next timer tick period (e.g., in 200 ms). Note that it is possible for this timer expiration to repeatedly yield unsuccessful CRTIMER responses, in which case the TCU 778 will undertake repeated attempts to obtain a successful response.

Timer Coherence

Figure 11:
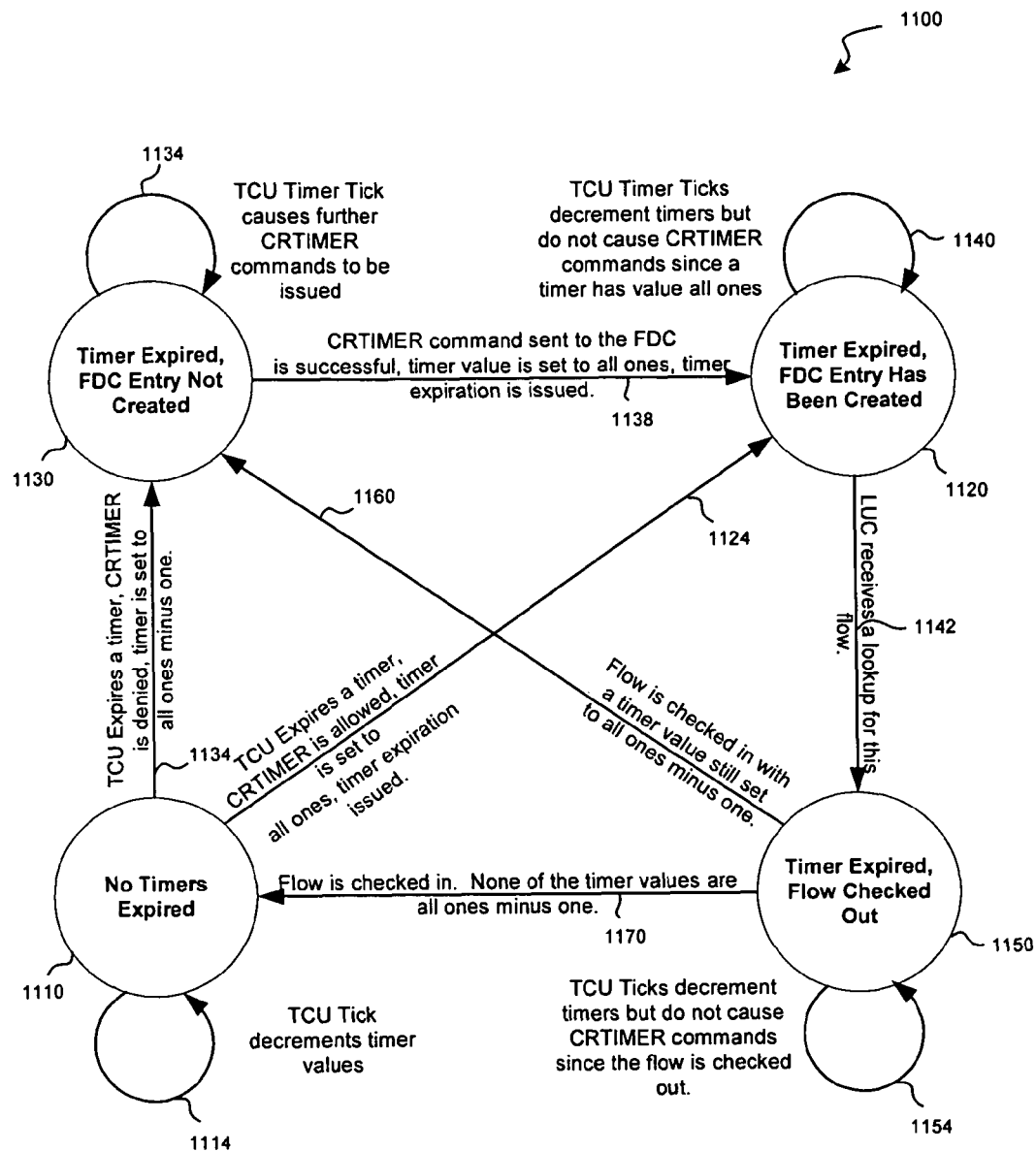
FIG. 11 is a flowchart which illustrates various state transitions experienced by an entry within a flow single flow upon expiration of its associated timers.

FIG. 11 is a flowchart 1100 which illustrates the various transitions experienced by an entry within the FDC 738 corresponding to a flow upon expiration of the timers associated with such flow. As is described below with reference to FIG. 11, the LUC 734 and FDC 738 are configured to interact so as to ensure that timer events are not "missed" and that CRTIMER commands are only issued when required.

Referring to FIG. 11, the state of an FDC entry for a particular flow begins in a No Timers Expired state 1110. During each cycle of the clock driving the TCU 778 (i.e., each "TCU tick"), all timers are decremented (step 1114) until eventually one of them expires and is given the penultimate value "all ones minus one". At this point the TCU 778 then issues a CRTIMER command. If this command is successful, the flow transitions to a Timer Expired, FDC Entry Has Been Created state 1120 and the timer value is set to "all ones" (step 1124); otherwise, the flow transitions to the Timer Expired, FDC Entry Not Created state 1130 (step 1134). In the latter case, the TCU 778 does not change the value of the timer from its state of all ones minus one. Accordingly, each time the TCU ticks a given flow it will attempt to issue a CRTIMER command (step 1134). Upon eventual successful issuance of the CRTIMER command, the flow transitions to the Timer Expired, FDC Entry Has Been Created state 1120 and a timer expired event is issued to the dispatcher 730 (step 1138).

A flow remains in the Timer Expired, FDC Entry Has Been Created state 1120 until the LUC 734 receives a lookup command for the given flow. The dispatcher 730 will issue such a lookup command after it receives a corresponding timer expiration event. Until such a lookup command is received, the TCU ticks for the given flow will not cause a CRTIMER to be issued (step 1140). This is because one of the timer values associated with the flow remains in the "all ones" state.

When the LUC 734 receives a lookup command for a flow in the Timer Expired, FDC Entry Has Been Created state, the flow transitions to a Timer Expired, Flow Checked Out state 1150 (step 1142). In this state TCU ticks will not cause CRTIMER commands to be issued, since the Checkout Bitmap for this flow will be of the value one (step 1154). At some point the LUC 734 will receive an update or teardown command for the given flow. Since the processor core 760, 764 supporting the flow is configured to service all timers registering a value of "all ones", it follows that this processor core 760, 764 must have either reset or disabled all such timers. However, if any timers register the value "all ones minus one", then the given flow is transitioned to the Timer Expired, FDC Entry Not Created state 1130 (step 1160). In such case the next TCU tick will cause a CRTIMER to be issued with respect to such timers. If there exist no timers registering the value "all ones minus one", or if the flow is torn down, then the flow transitions to the No Timers Expired state 1110 (step 1170).

Based upon the foregoing, it is clear that the LUC 734 and FDC 738 operate to ensure that no timer events are inappropriately overlooked and that CRTIMER commands are repeatedly issued to the FDC 738 until one succeeds. It is also observed that after the first CRTIMER command is successful, no future CRTIMER commands are issued until the flow is again checked in.

Role of Dispatcher in Timer Management

Operational Environment

Figure 12:
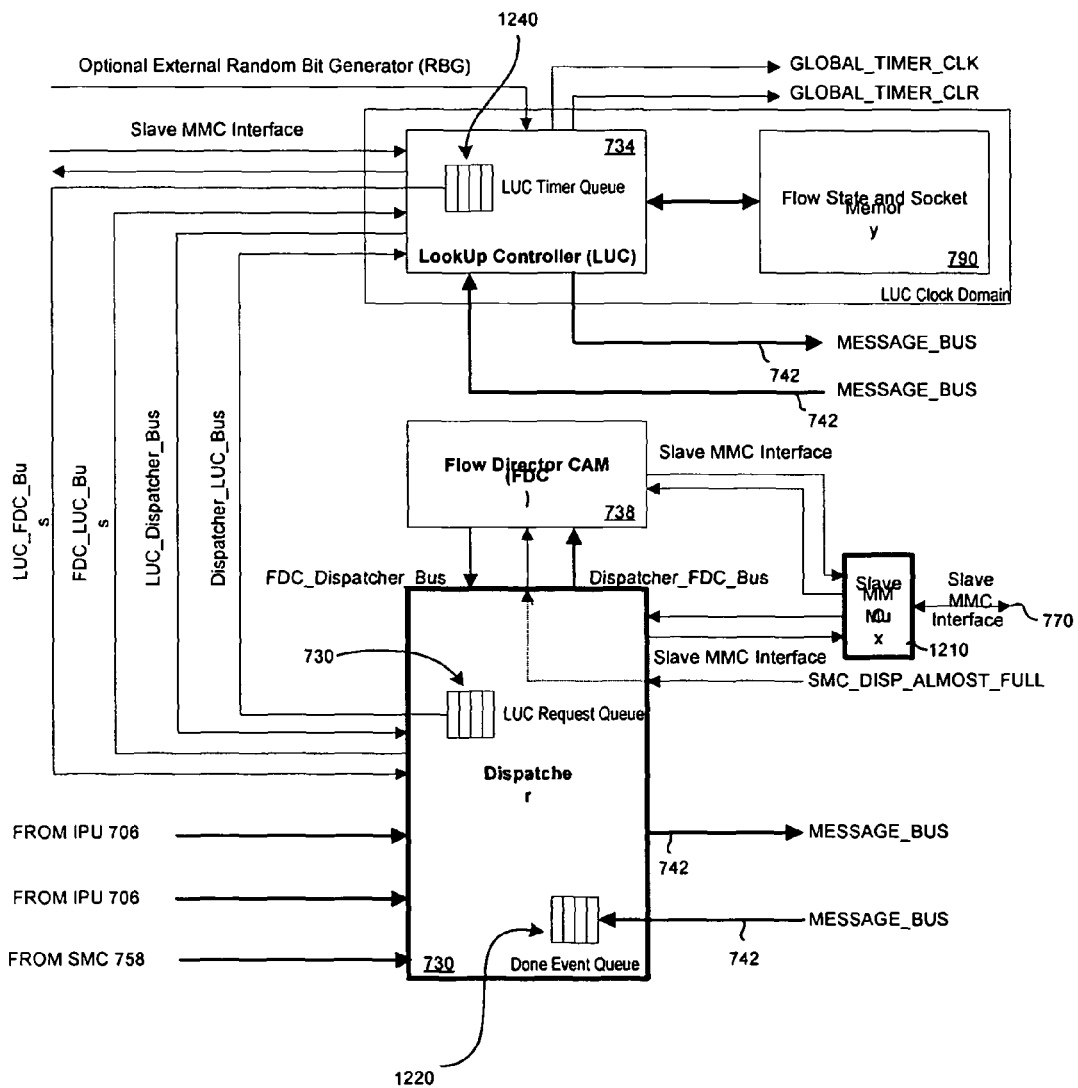
FIG. 12 provides a block diagram illustrating the principal functional components of a dispatcher unit of the SPPS of FIG. 7.

FIG. 12 provides a block diagram illustrating certain aspects of the operational environment of the dispatcher 730. In operation, the dispatcher 730 processes events from one of two IPUs 706, the SMC 758, the processor cores 760, 764 and the LUC 734. All network packet events, host events and timer events go through the dispatcher 730. After processing by the dispatcher 730, events are then moved to a processor core 760, 764 using the message bus 742. When the processor core 760, 764 has finished processing the event, it issues a done event to the dispatcher 730 using the message bus 742.

In the embodiment of FIG. 12, events that are received by the dispatcher 730 from an IPU 706 have been formatted by a packet processor 710. In this embodiment multiple packet processors 710 parse the same IPU stream, so the IPU employs special techniques to ensure that order is preserved. That is, the dispatcher 730 will not generally be configured to perform this re-ordering.

Referring to FIG. 12, it is observed that both the dispatcher 730 and the FDC 738 share the same ManageMent and Control (MMC) interface 772. The dispatcher 730 includes or is associated with a small functional component, the Slave MMC Mux 1210, operative to distribute this bus to both the primary functional components of the dispatcher 730 and to the FDC 738. As a consequence, all of the registers of the FDC 738 will generally be mapped into the dispatcher 730.

The dispatcher 730 includes a Done Event queue 1220 from the message bus 742 that is used for Done events. This queue 1220 has the capability to assert backpressure to the message bus 742, which indicates that a new event should not be sent (processing of the existing event is allowed to be completed). In the exemplary implementation the dispatcher 730 is not configured to be capable of "dropping" events. Rather, the dispatcher 730 appropriately marks any event that is to be dropped and forwards it to the applicable processor core 760, 764. The dispatcher 730 further includes a LUC Request queue 1230, within which are queued flowstate lookup requests to be provided to the LUC 734.

Dispatcher Input Events

The dispatcher 730 is configured to process four major event types: packet events, timer events, host events and Done events. The manner in which the dispatcher 730 processes timer events and effects related processing is described hereinafter.

The TCU 778 of the LUC 734 is responsible for keeping per flow timers. If such a timer expires then a timer event is issued to the dispatcher 730. Issuance of these events is complicated by the fact that a packet or host event should never be serviced before a timer event. This is because the packet or host event could otherwise cause the timer event to be cancelled; however, such cancellation may not be effected by the applicable processor core 760, 764 once the timer event has been issued by the LUC 734. As a consequence, the dispatcher 730 may process a non-timer event only to find that the FDC 738 signals that it is in the TIMER state. This indicates that the LUC 734 has expired the timer, and that the event is in transit from the LUC 734 to the timer queue on the dispatcher 730. In this case the dispatcher 730 must stop processing the current event, and change to processing the timer event in the timer queue.

Role of FDC in Management of Protocol Timers

Overview

The FDC 738 is used to ensure coherency between all of the processor cores 760, 764. Specifically, the FDC 738 ensures that if a processor core 760, 764 is processing a particular event of a protocol's flow, then any events that are received during that time are sent to the same core 760, 764. This simplifies the task of maintaining coherency, and removes the need for any special semaphores or locking on the flow state.

The FDC 738 manages the assignment and release of the processor cores 760, 764, and runs in either single-core mode or dual-core mode. In single-core mode, the FDC 738 allocates a single processor core 760, 764 for each entry within the FDC 738. In dual-core mode, the FDC 738 allocates two processor cores 760, 764, i.e., a protocol core and an interface core, for each entry within the FDC 738. In the exemplary embodiment the protocol core and the interface core are included within the same protocol cluster 746, 750.

A single configuration bit in the CONTROL register of the FDC 738 determines its operative mode. That is, in the exemplary embodiment the FDC 738 operates in either one mode or the other, and does not switch between the two modes. However, in other embodiments the mode may be determined based upon the event type. The single-core mode of operation allows all available processor cores 760, 764 to be used for processing events. In the dual-core mode, the processor cores 760, 764 may be split into multiple groups of protocol cores and interface cores.

When the FDC 738 operates in accordance with the single-core mode, successive events from the same flow are always routed to the same processor cores 760, 764. Accordingly, in this mode the maximum bandwidth of a single flow is equivalent to the processing speed of a single processor core 760, 764. This necessitates the use of at least as many flows as there are processor cores 760, 764 to obtain maximum throughput.

The FDC 738 also manages the assignment and release of the event queue elements of the processor cores 760, 764 and workspace IDs. In the case of the dual-core mode of operation, this involves the allocation of two processor cores 760, 764, an event queue element and two workspace IDs.

The flow key indexes each entry in the FDC 738. For TCP termination this flow key will be a 116 bit value consisting of the {IP Destination Address, IP Source Address, Destination Port, Source Port, IP Protocol, Source ID Number} tuple. Each entry in the FDC 738 also has an associated payload that contains the assigned protocol core, the protocol core workspace ID, the assigned interface core, the interface core workspace ID, an event count (EC) and other flags.

At a high level, the operation of the FDC 738 may be straightforwardly described. In particular, for each packet or application event that the dispatcher 730 processes, the FDC 738 is invoked to determine if the event's flow key is present. If so, then the payload of the FDC 738 describes which pair of processor cores 760, 764 are currently processing this flow. The event is then passed to one of those processor cores, and the event count is incremented. If the event's flow key is not found in the FDC 738 then the dispatcher 730 must create an entry, assign it one or two processor cores 760, 764, and assign it an event count of one. The FDC 738 thus ensures that while any event in a flow is being processed, all events go to the same pair of processor cores 760, 764.

The event count of the FDC 738 is used to determine when a FDC entry can be removed. Each time a pair of processor cores 760, 764 has finished processing an event, a Done message is sent to the dispatcher 730. The dispatcher 730 then finds the event count of the associated FDC entry, and decrements it. If this event count reaches zero then there are no outstanding events in transit, so the dispatcher 730 signals to the LUC 734 that the flow state can be written back to the flowstate memory. After the LUC 734 has written back the flow state it removes the entry from the FDC 738. It is important to note that even though a pair of processor cores 760, 764 may be allocated, only one of those pairs replies with a stateful Done event.

In order to process an event a processor core 760, 764 needs two pieces of information: the event itself, and the workspace ID associated with that event. Each processor core 760, 764 has an event queue that is used to receive events from the dispatcher 730. In order to maintain free/busy information, the FDC 738 assigns each position in this queue an event number. Each processor core 760, 764 also has some number of workspace IDs, in which the FDC 738 also maintains free/busy information.

Timer events also use the FDC 738. When the TCU 778 determines that a timer has expired, it creates an entry in the FDC 738 with the associated flow key. The reason a timer entry is created is to force a synchronization point between the LUC 734 and the dispatcher 730. This is because packet and interface events must not be processed before the timer expired event. The dispatcher 730 is next given a "Timer Expired" message, and it updates the FDC entry with the assigned pair of processor cores. This timer event is now treated in a similar fashion to the packet and application event handling described above.

Figure 13:
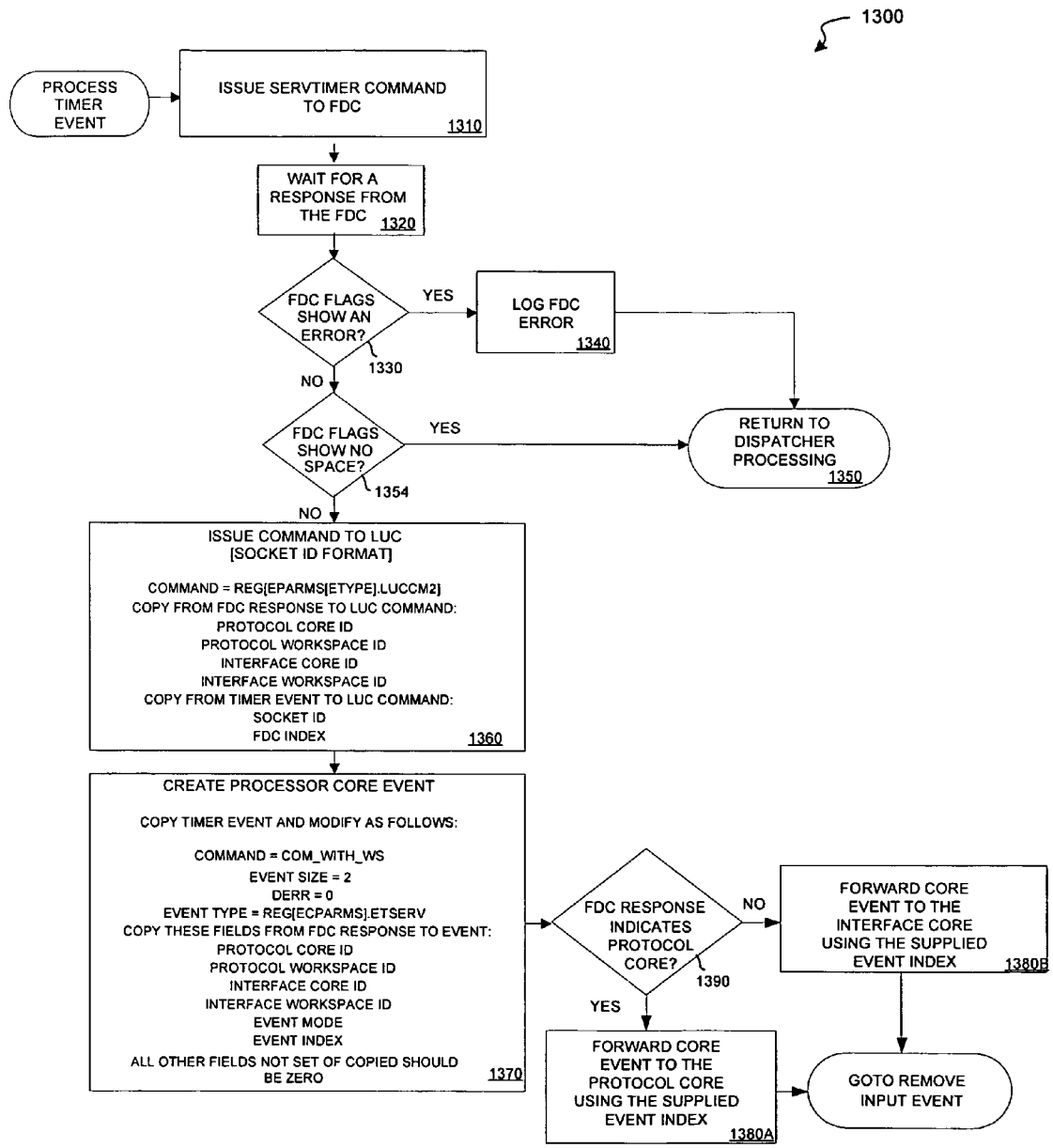
FIG. 13 is a flowchart of an exemplary Process Timer Event routine executed in connection with flow director unit entries in a TIMER state.

Turning now to FIG. 13, a flowchart is provided of an exemplary Process Timer Event routine 1300 that is executed when an entry is found in the FDC 738 that is in the TIMER state or a timer queue 1240 of the LUC 734 is found to not be empty. In the exemplary embodiment only the TCU 778 may create TIMER entries in the FDC 738, and it will do so when a timer expires. The purpose of creating such an entry is to ensure that if a timer expires while servicing a packet/host event, the timer will always be serviced before servicing the packet/host event. This is because servicing a packet or host event may cause the timer to be cancelled, but by this point no opportunity exists to rescind the timer expiration. It is observed that once a flow is checked out from the LUC 734 to the local memory 780, 784 of a processor core 760, 764, no timer events will be issued for such flow until it is again checked in to flowstate memory 790. At this point the LUC 734 may cancel pending timers based upon the new timer values (as set by the processor cores 760, 764).

An initial task performed in connection with execution of the Process Timer Event routine 1300 is the assignment of a processor core 760, 764 and workspace ID pair to an FDC entry created upon expiration of a timer. This assignment is performed by issuing a SERVTIMER command to the FDC 738 (step 1310). The response from the FDC 738 is then examined to determine if the SERVTIMER command was successful (step 1320). If the FDC 738 indicates that an error has occurred (step 1330), then this occurrence is logged (step 1340) and processing returns to the main loop executed by the dispatcher 730 (step 1350). If the FDC 738 indicates that sufficient space or resources are not available to service the timer event (step 1354), then the timer event is left outstanding and processing continues with the main loop executed by the dispatcher 730 (step 1350). It is anticipated that there will eventually be sufficient resources available in the FDC 738 to enable the timer event to be subsequently serviced.

If the FDC 738 does not indicate that an error condition exists and does indicate that sufficient space is available to process the timer event, then the corresponding FDC entry is in the RECEIVED state. In this case a lookup request is issued to the LUC 734 in order to cause the applicable flow state to be written to the local memories 780, 784 of the assigned protocol and interface cores (step 1360). A processor core event is then created (step 1370) on the basis of the timer event and forwarded to the assigned processor core and event queue element (step 1380), as indicated by the response of the FDC 738 (step 1390). In the exemplary embodiment the Socket ID is set to zero when creating the processor core event even though the correct value is known. Setting the Socket ID to zero is consistent with the operation of the dispatcher 730 for non-timer events, where it does not modify the Socket ID.

FDC—Specific End Cases and Race Conditions

The FDC 738 will generally be configured to be capable of appropriately handling a number of end cases and race conditions. For example, if an event is received after the dispatcher 730 has issued an update request to the LUC 734, then the LUC 734 should in some way be informed that an event has arrived and that it should not delete the entry from the FDC 738. In addition, a small period of time exists during which a timer has expired on a flow, but the dispatcher 730 has not yet read the Timer Expired message. In this case it needs to be determined what course of action should be pursued by the dispatcher 730 if it receives an event during this period of time, and the manner in which the FDC 738 will signal that this condition has occurred. In order to address these issues, the FDC 738 assigns a state to each entry and uses a state machine to determine the correct action to perform. The operation of this state machine is described in further detail hereinafter.

Flow Director State Diagram and Transitions

Figure 14:
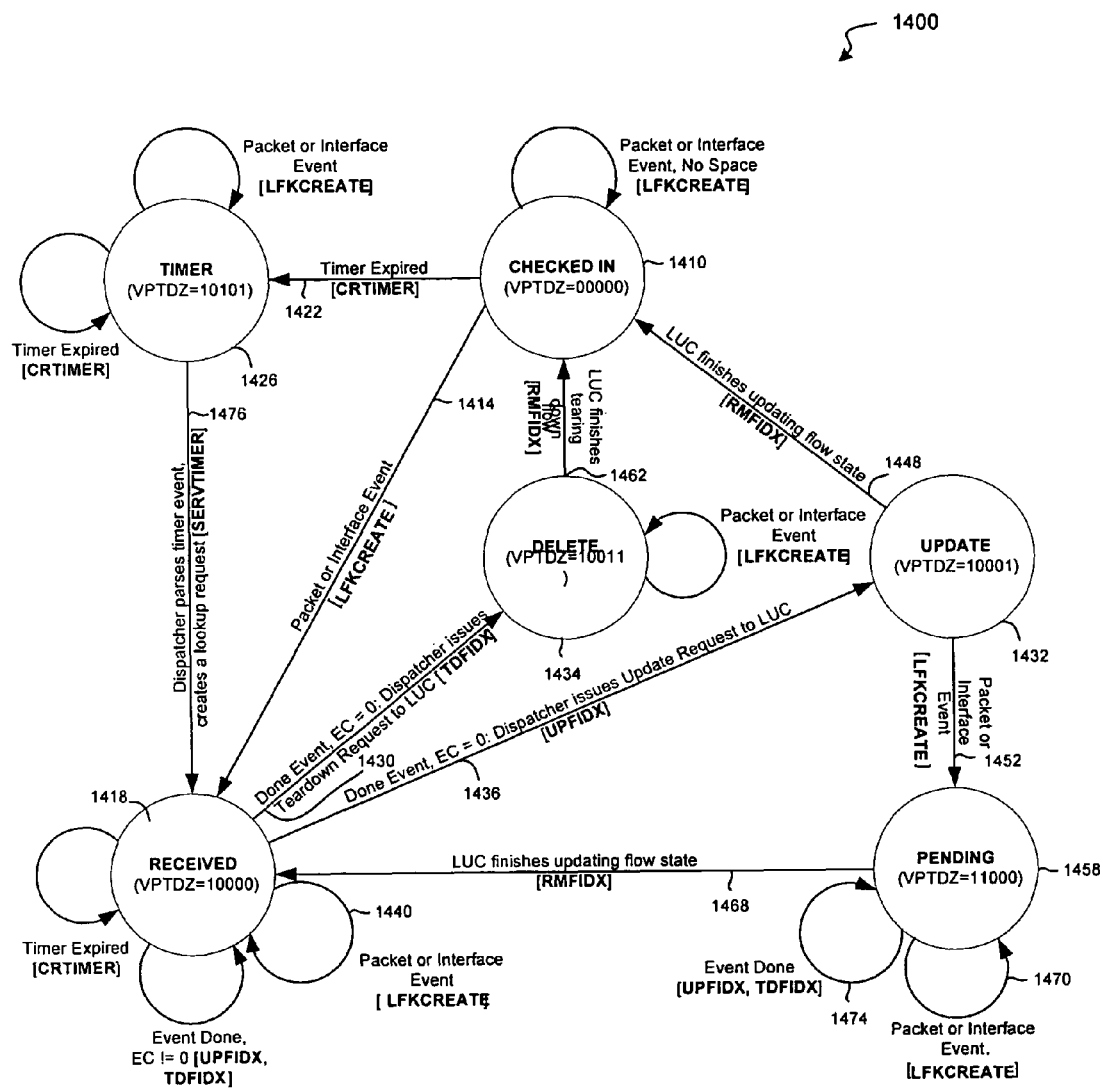
FIG. 14 is a state transition diagram representative of the manner in which a single entry of the flow director unit may transition between a number of states.

FIG. 14 is a state transition diagram 1400 representative of the manner in which a single entry of the FDC 738 may transition between a number of states. Each node in the diagram of FIG. 14 corresponds to a different state, with the VPTDZ terminology indicating the Valid, Pending, Timer, Deleting and Zero flags respectively. It is observed that the diagram 1400 does not include any transitions for the GETEVENT or RELEVANT commands. This is because these commands do not cause state transitions for FDC entries; instead, in the exemplary embodiment these commands simply allocate and de-allocate event queues and processor cores.

Each entry of the FDC 738 begins in the CHECKED IN state 1410, where the Valid bit is not set, i.e. the entry is not valid and is unused. Transitions out of the CHECKED IN state indicate that an entry is being created, while transitions into the state indicate that an entry has been deleted. One transition out of the CHECKED IN state 1410 occurs when the dispatcher 730 receives a packet or interface event and issues a lookup command to the FDC 738 (LFKCREATE) (step 1414). In this case the FDC 738 creates an entry and places it in a RECEVIED state 1418. Another transition out of the CHECKED IN state 1410 occurs when the LUC 734 determines that a timer has expired for a flow and issues a create timer (CRTIMER) command to the FDC 738 (step 1422). In this case the FDC 738 examines the SMC_DISP_Almost_Full signal and, if allowed to, creates an FDC entry and puts it into a TIMER state 1426.

The RECEIVED state 1418 indicates that a given FDC entry is valid, and that an event is currently being processed for the given flow. One transition out of the RECEIVED state 1418 occurs when the dispatcher 730 receives an Event Done message and issues an update (UPFIDX) or tear down (TDFIDX) command (steps 1430). This indicates that processing of an event previously issued to a processor core 760, 764 has been completed. In this case the dispatcher 730 will decrement the Event Count (EC) of the FDC entry. If the Event Count reaches zero (i.e., all events for the applicable flow have been processed), then the FDC entry is transitioned into the UPDATE state 1432 if the dispatcher 730 issues a tear down request (TDFIDX) to the LUC 734 (step 1430). Alternately, the FDC entry is transitioned into the DELETE state 1434 if the dispatcher 730 issues an update request (UPFIDX) to the LUC 734 (step 1436). If the Event Count does not reach zero, then the FDC 738 is left in the RECEIVED state 1418. Another transition out of the RECEIVED state 1418 occurs when the FDC 738 receives a lookup command (LFKCREATE) due to the dispatcher 730 receiving another packet or interface event (step 1440). In this case the FDC entry is found and the Event Count is incremented, leaving the FDC entry in the RECEIVED state 1418.

The UPDATE state 1432 is entered just before the dispatcher 730 requests that the LUC 734 update its flow state memory with the new flow state. One transition out of the UPDATE state 1432 occurs when the LUC 734 finishes updating the flow state. In this case the LUC 734 will issue a remove (RMFIDX) command to the FDC 738 to delete the applicable FDC entry, which returns such entry to the CHECKED IN state (step 1448). It is observed that before the LUC 734 issues the RMFIDX command it must set the workspaces associated with both the protocol and interface cores to invalid. This ensures that the next flow utilizing these workspaces is processed correctly.

Another transition out of the UPDATE state 1432 occurs when the dispatcher 730 receives a packet or interface event and issues a lookup command (LFKCREATE) to the FDC 738 (step 1452). Receipt of such an event causes the FDC entry to enter a PENDING state 1458. There is no need to copy either workspace contents to either of the processor cores 760, 764, since the prior workspace versions present therein will remain correct but will not yet have been marked as valid. When the LUC 734 issues a RMFIDX command and determines that an entry is in the PENDING state 1458, it will return to the workspaces and mark them as valid.

The DELETE state 1434 is entered just before the dispatcher 730 requests that the LUC 734 teardown a flow whose Event Count has reached zero. This state is used to indicate that any events received during the tear down process should be either discarded or sent to a processor core 760, 764 after being classified as "flow is being torn down". A transition out of the DELETE state 1434 can only occur when the LUC 734 has finished deleting the flow and removes the FDC entry with the RMFIDX command, and results in assumption of the CHECKED IN state 1410 (step 1462). In the exemplary embodiment the CRTIMER command is not valid in the DELETE state 1434, and the LUC 734 is configured to not issue such a command while the FDC entry is in this state.

The existence of an FDC entry within the PENDING state 1458 indicates that, in response to arrival of a new packet or application event, the dispatcher 730 had previously issued a request for the LUC 734 to update flowstate memory 790. In this case the dispatcher 730 will pass the packet or application event to the applicable processor cores 760, 764 for processing. The processor cores 760, 764 are then allowed to process this event, since the workspace IDs are still marked as valid. When the LUC 734 issues the RMFIDX command, the FDC 738 transforms the state of the entry to RECEIVED 1418 (step 1468); that is, just as if a packet or interface event had arrived when an update request was not pending. If more lookup request commands (LFKCREATE) are received while in the PENDING state 1458, then the Event Count (EC) is simply incremented and the FDC 738 remains in the PENDING state 1458 (step 1470).

In the exemplary embodiment allowance is made for receiving done messages from the processor cores 760, 764 with the FDC entry in the PENDING state 1458. In this state the FDC 738 does nothing in response to UPFIDX or TDFIDX commands, it merely indicates that the FDC entry is in the PENDING state 1458 (step 1474). This assumes that the dispatcher 730 will back off and re-issue the FDC command at a later date. In this way it is ensured that the LUC 734 does not have two updates active for the same flow.

The TIMER state 1426 is used to indicate that the LUC 734 has a timer pending on a particular flow. This is the only case when the LUC 734 will create an entry in the FDC 738. Transition out of the TIMER state 1426 occurs when the FDC 738 receives a service timer (SERVTIMER) command. This will occur when the dispatcher 730 places a lookup request to the LUC 734. Upon receipt of a SERVTIMER command, the FDC 738 may transition the entry to the RECEIVED state 1418 (step 1476). In the exemplary embodiment the existence of an FDC entry in the TIMER state 1426 results in suspension of the processing of packet or interface events associated with the corresponding flow. That is, the existence of the TIMER state 1426 causes the dispatcher 730 to service the outstanding timer event before servicing any additional packet or interface events. Upon receipt of a CRTIMER command for a particular flow, the FDC 738 maintains the applicable FDC entry within the TIMER state 1426 and does not indicate an error. This allows the LUC 734 to issue a CRTIMER command even if it has already successfully done so.

A number of embodiments of the present invention have been described. Nevertheless, it will be understood that various modifications may be made without departing from the scope of the invention. For example, [0100] the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order. Moreover, the numerical values for the operational and implementation parameters set forth herein (e.g., bus widths, DDR burst size, number of PPCs, amount of memory) are merely exemplary, and other embodiments and implementations may differ without departing from the scope of the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method of processing data in a stateful protocol processing system configured to process multiple flows of messages, said method comprising:
   receiving a first plurality of messages of a first of said flows, said first of said flows comporting with a first stateful protocol;
   assigning a first protocol processing core to process event information derived from said first plurality of messages;
   setting a first flow timer associated with said first of said flows;
   generating a first timeout expiration event upon expiration of said first flow timer; and
   forwarding said first timeout expiration event to said first protocol processing core;
   storing a first flow state associated with said first of said flows in a common memory;
   checking out said first flow state to a first local memory associated with said first protocol processing core;
   maintaining a plurality of timers associated with said first of said flows within said common memory; and
   storing values of said plurality of timers within a timer cache upon said checking out of said first flow state.

2. The method of claim 1 further including:
   setting a second flow timer associated with a second of said flows;
   generating a second timeout expiration event upon expiration of said second flow timer; and forwarding said second timeout expiration event to a second protocol processing core.

3. The method of claim 1 further including retrieving said first flow state associated with said first of said flows in response to said first timeout expiration event.

4. The method of claim 1 further including providing said first flow state to said first protocol processing core.

5. The method of claim 1 wherein a plurality of timers are associated with said first of said flows, said method further including issuing timer expiration events upon expiration of ones of said plurality of timers.

6. The method of claim 5 further including inhibiting issuance of said timer expiration events subsequent to said checking out of said first flow state.

7. The method of claim 1 further including decrementing or otherwise modifying said values of said plurality of timers within said timer cache.

8. The method of claim 1 further including modifying a state of said first of said flows upon generation of said first timeout expiration event.

9. A method of processing data in a stateful protocol processing system configured to process multiple flows of messages, said method comprising:
receiving a first plurality of messages of a first of said flows, said first of said flows comporting with a first stateful protocol;
assigning a first protocol processing core to process event information derived from said first plurality of messages;
storing values of a plurality of timers associated with said first of said flows, said first protocol processing core setting a reset bit associated with one of said plurality of timers; and
adjusting a value of said one of said plurality of timers in response to said setting of said reset bit;
storing a first flow state associated with said first of said flows in a common memory;
checking out said first flow state to a first local memory associated with said first protocol processing core;
maintaining said plurality of timers associated with said first of said flows within said common memory; and
storing values of said plurality of timers within a timer cache upon said checking out of said first flow state.

10. The method of claim 9 further including:
generating a first timeout expiration event upon expiration of said one of said plurality of timers; and
forwarding said first timeout expiration event to said first protocol processing core.

11. The method of claim 10 further including:
retrieving a first flow state associated with said first of said flows in response to said first timeout expiration event; and
providing said first flow state to said first protocol processing core.

12. A stateful protocol processing apparatus configured to process multiple flows of messages, said apparatus comprising:
a first protocol processing core;
a common memory;
an input module configured to receive a first plurality of messages of a first of said flows, said first of said flows comporting with a first stateful protocol;
a dispatcher operative to assign said first protocol processing core to process event information derived from said first plurality of messages, said dispatcher storing a first flow state associated with said first of said flows in said common memory; and
a lookup controller configured to generate a first timeout expiration event upon expiration of a first flow timer associated with said first of said flows, said lookup controller forwarding said first timeout expiration event to said dispatcher, said lookup controller checking out said first flow state to a first local memory associated with said first protocol processing core, said lookup controller including a timer control unit configured to maintain a plurality of timers associated with said first of said flows within said common memory, wherein said lookup controller stores values of said plurality of timers within a timer cache upon said checking out of said first flow state.

13. The apparatus of claim 12 further including a flow director unit disposed to maintain a flow state table having a plurality of entries corresponding to said multiple flows, said lookup controller creating, in response to said first timeout expiration event, a first entry within said flow director unit corresponding to said first of said flows.

14. The apparatus of claim 13 wherein said flow director unit transitions said first entry out of a timer state into a different state in response to receipt of a service timer command associated with servicing of said timeout expiration event.

15. The apparatus of claim 12 wherein said dispatcher is operative to service said timeout expiration event by requesting said lookup controller to retrieve said first flow state from said common memory.

16. The apparatus of claim 15 wherein said lookup controller is operative to provide said first flow state and said timeout expiration event to said first protocol processing core.

17. The apparatus of claim 12 wherein said lookup controller is operative to decrement or otherwise modify ones of said values of said plurality of timers within said timer cache.

18. The apparatus of claim 12 further including a second protocol processing core, said dispatcher being operative to assign said second protocol processing core to process event information derived from a second plurality of messages of a second of said flows.

* * * * *